US009330270B2

(12) United States Patent
Ochiai et al.

(10) Patent No.: US 9,330,270 B2
(45) Date of Patent: May 3, 2016

(54) ENCRYPTION PROCESSING DEVICE AND AUTHENTICATION METHOD

(71) Applicant: FUJITSU LIMITED, Kawasaki-shi, Kanagawa (JP)

(72) Inventors: Takao Ochiai, Funabashi (JP); Kouichi Itoh, Kawasaki (JP); Dai Yamamoto, Kawasaki (JP); Kazuyoshi Furukawa, Kawasaki (JP); Masahiko Takenaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 138 days.

(21) Appl. No.: 14/161,293

(22) Filed: Jan. 22, 2014

(65) Prior Publication Data

US 2014/0164785 A1 Jun. 12, 2014

Related U.S. Application Data

(63) Continuation of application No. PCT/JP2011/067170, filed on Jul. 27, 2011.

(51) Int. Cl.
*H04L 29/00* (2006.01)
*G06F 21/60* (2013.01)
(Continued)

(52) U.S. Cl.
CPC .............. *G06F 21/602* (2013.01); *G06F 21/44* (2013.01); *H04L 9/002* (2013.01); *H04L 9/0816* (2013.01);
(Continued)

(58) Field of Classification Search
CPC ................................................ G06F 2211/003
USPC .......... 713/168–181; 726/1–4, 16–21, 26–30; 380/277–29
See application file for complete search history.

(56) References Cited

U.S. PATENT DOCUMENTS 6,182,215 B1* 1/2001 Tatebayashi et al. .......... 713/168
2004/0068653 A1* 4/2004 Fascenda ...................... 713/168
(Continued)

FOREIGN PATENT DOCUMENTS

JP 04-117038 4/1992
JP 10-049640 2/1998
(Continued)

OTHER PUBLICATIONS

Notification of Transmittal of Translation of the International Preliminary Report on Patentability (Form PCT/IB/338, Form PCT/IB/373 & Form PCT/ISA/237), PCT/JP2011/067170, 8 pages, dated Feb. 6, 2014.
(Continued)

*Primary Examiner* — Madhuri Herzog
(74) *Attorney, Agent, or Firm* — Fujitsu Patent Center

(57) ABSTRACT

An encryption processing device includes a memory configured to store a common key, and a processor configured to generate a random number which is an integer, to perform a bit transposition on the common key, the bit transposition being determined at least by the random number, to transmit the random number to another encryption processing device and to receive a response from the other encryption processing device, the response obtained by encryption using a common key stored in the other encryption processing device and a second randomized key generated by performing the bit transposition determined by the random number; and to authenticate the other encryption processing device either by comparing the response with the random number by decrypting the response with the common key, or by comparing the random number with the response by encrypting the random number with the common key.

11 Claims, 39 Drawing Sheets

(51) Int. Cl.
*G06F 21/44* (2013.01)
*H04L 9/08* (2006.01)
*H04L 9/00* (2006.01)
*H04L 9/32* (2006.01)

(52) U.S. Cl.
CPC ............ *H04L 9/0861* (2013.01); *H04L 9/0869* (2013.01); *H04L 9/3271* (2013.01); *H04L 2209/08* (2013.01); *H04L 2209/12* (2013.01)

(56) References Cited

U.S. PATENT DOCUMENTS

2008/0212776 A1* 9/2008 Motoyama .................... 380/252
2010/0316217 A1   12/2010 Gammel et al.
2011/0201359 A1   8/2011 Naganuma et al.

FOREIGN PATENT DOCUMENTS

| JP | 2008-118566 | 5/2008 |
| JP | 2008-526078 | 7/2008 |
| JP | 2009-288758 | 12/2009 |
| JP | 2010-034682 | 2/2010 |
| JP | 2010-226707 | 10/2010 |
| JP | 2011-010291 | 1/2011 |
| WO | 2006067739 | 6/2006 |

OTHER PUBLICATIONS

Paul C. Kocher, "Timing Attacks on Implementations of Diffie-Hellman, RSA, DSS, and Other Systems", CRYPT0 '96, LNCS 1109, pp. 104-113, 1996.

Thomas S. Messerges, et al., "Power Analysis Attacks of Modular Exponentiation in Smartcards", CHES '99, LNCS 1717, pp. 144-157, 1999.

Paul Kocher et al., "Differential Power Analysis", CRYPTO '99, LNCS 1666, pp. 388-397, 1999.

S. Chari, et al., "A Cautionary Note Regarding Evaluation of AES Candidates on Smart-Cards", pp. 1-15, Feb. 1, 1999.

Thomas S. Messerges, et al., "Securing the AES Finalists Against Power Analysis Attacks", FSE2000, LNCS 1978, pp. 150-164, 2001.

Thomas S. Messerges, et al., "Investigations of Power Attacks on Smartcards", USENIX Workshop on Smartcards, Technology, May 10-11, 1999.

Souichi Okada et al, "AES hardware implementation for smart cards", Information Processing Society of Japan, pp. 111-118, Jul. 25, 2001. Partial English translation of "3. Round processing unit" on p. 112 and Fig. 1 on p. 113.

International Search Report corresponding to PCT/JP2011/067170, mailed on Oct. 11, 2011.

* cited by examiner

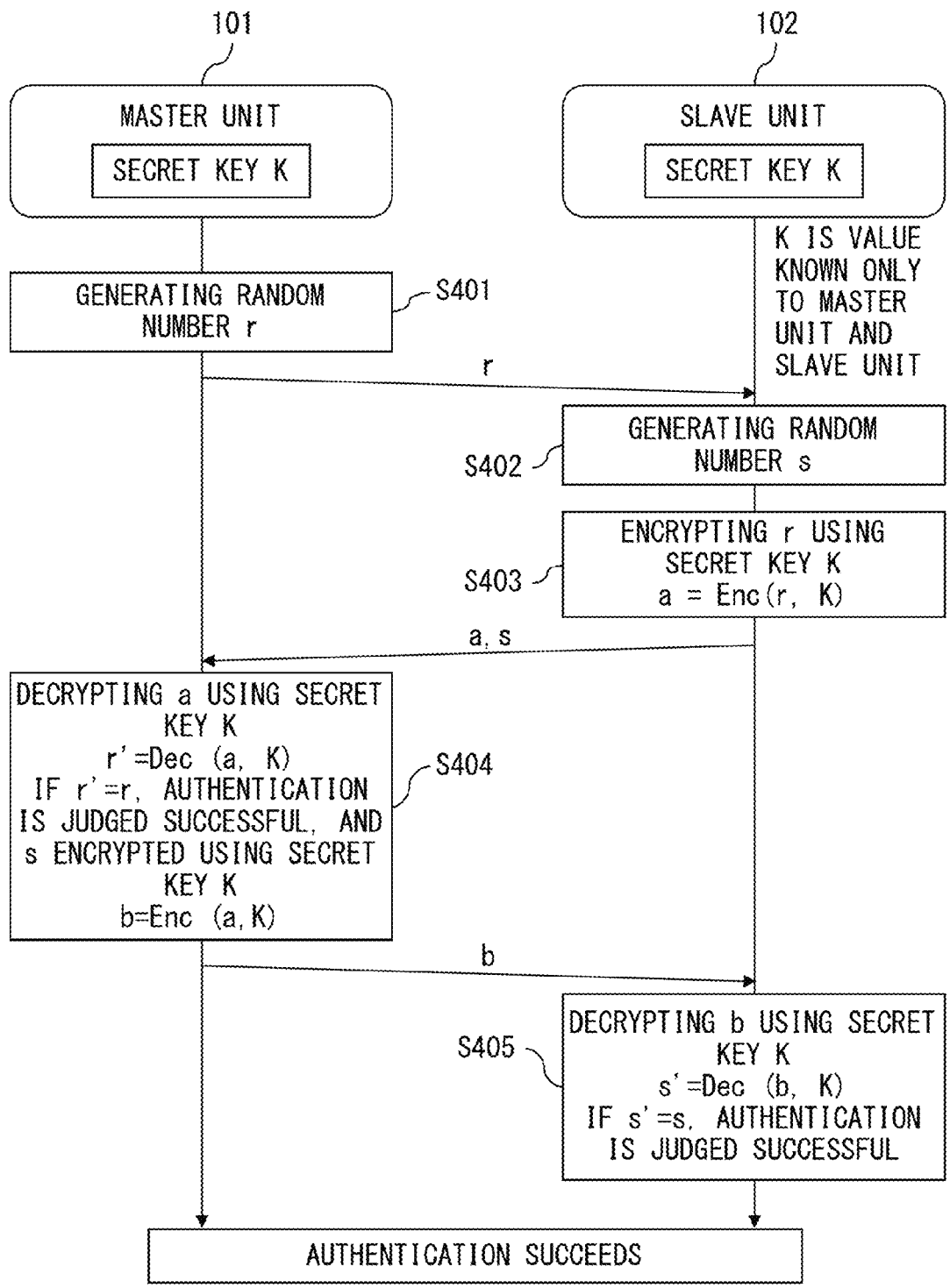
F I G. 3

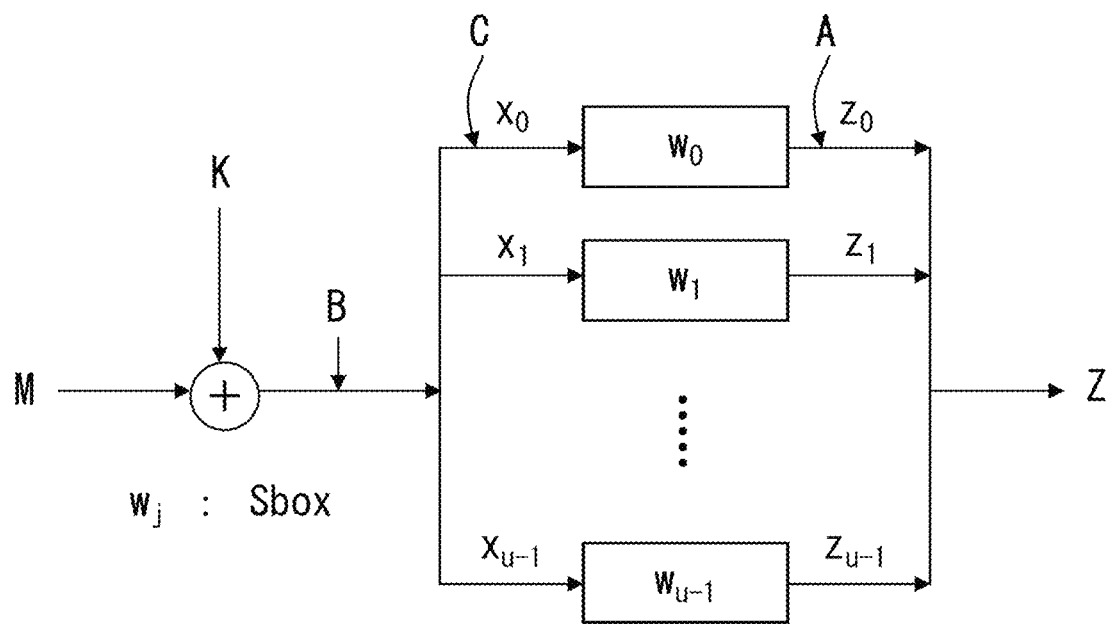
F I G. 4

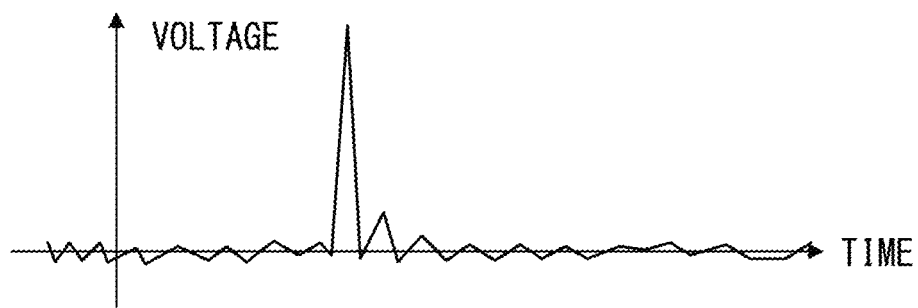
F I G. 6

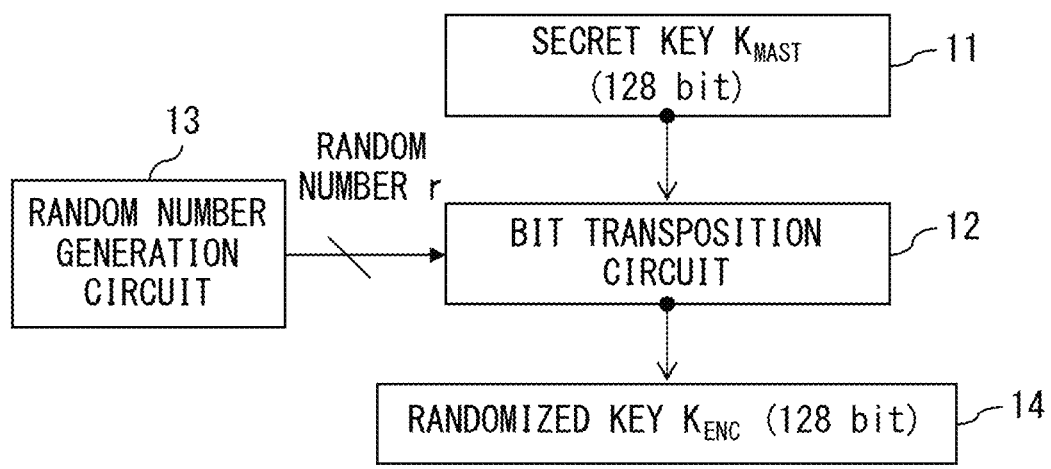
F I G. 10

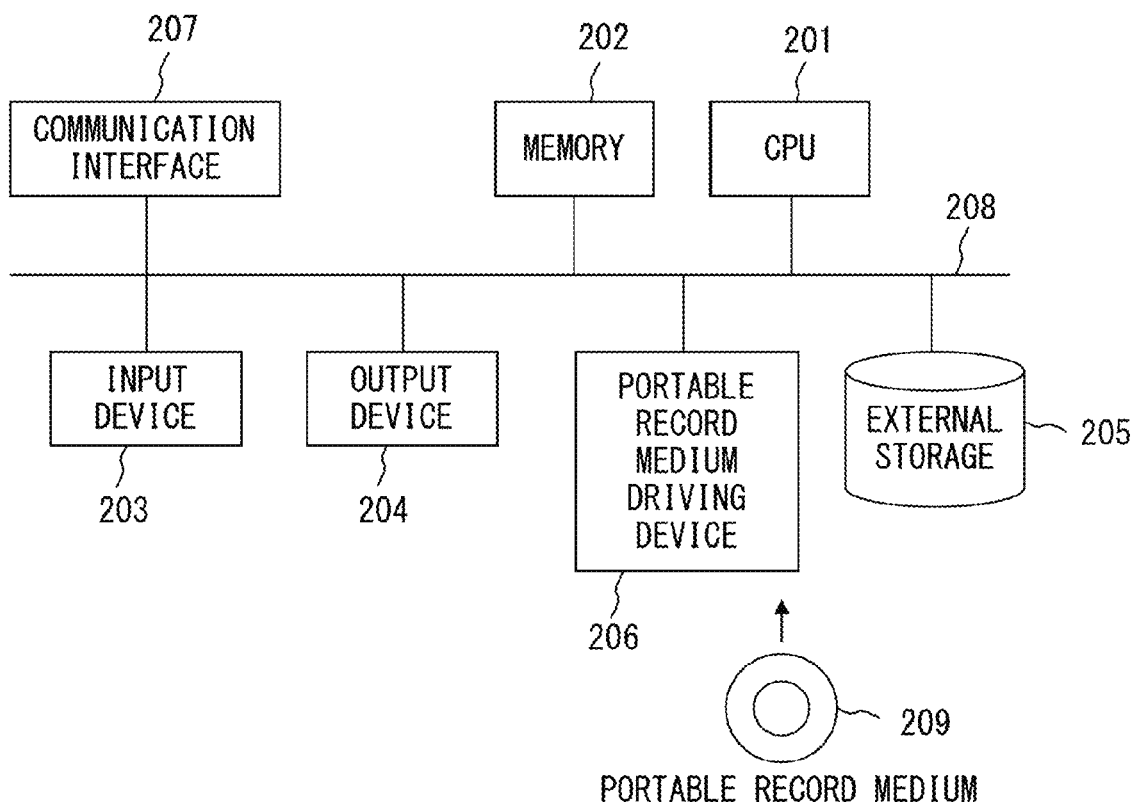
F I G. 1 2

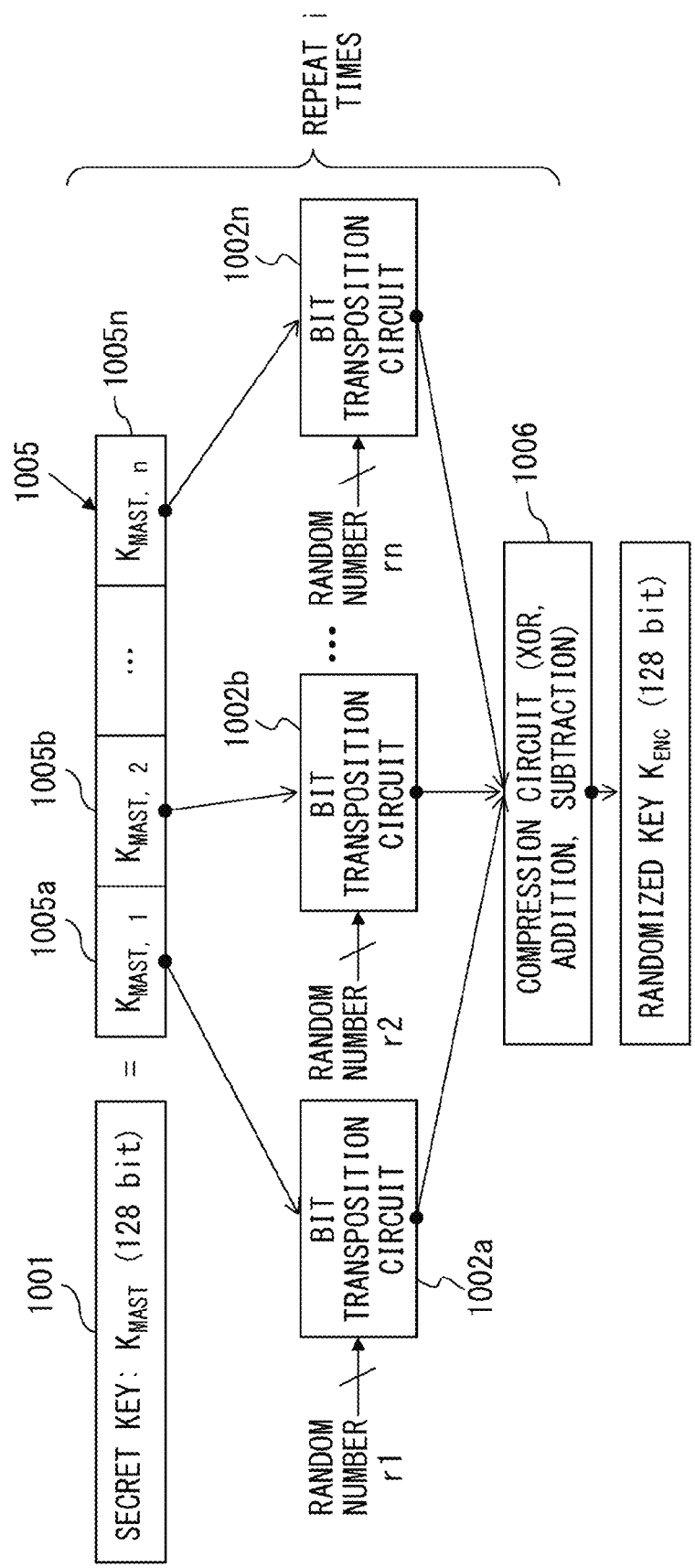
F I G. 13

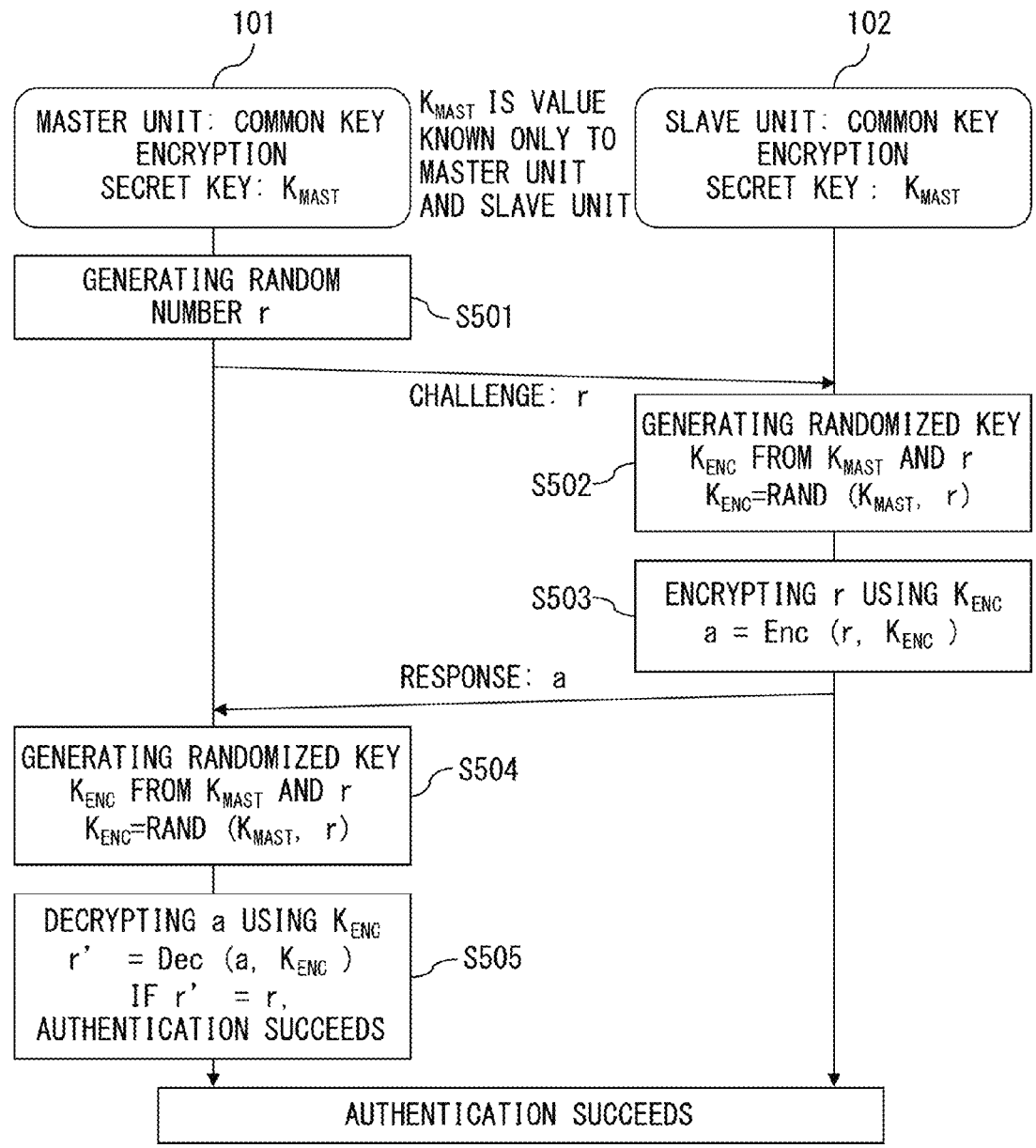
F I G. 1 4

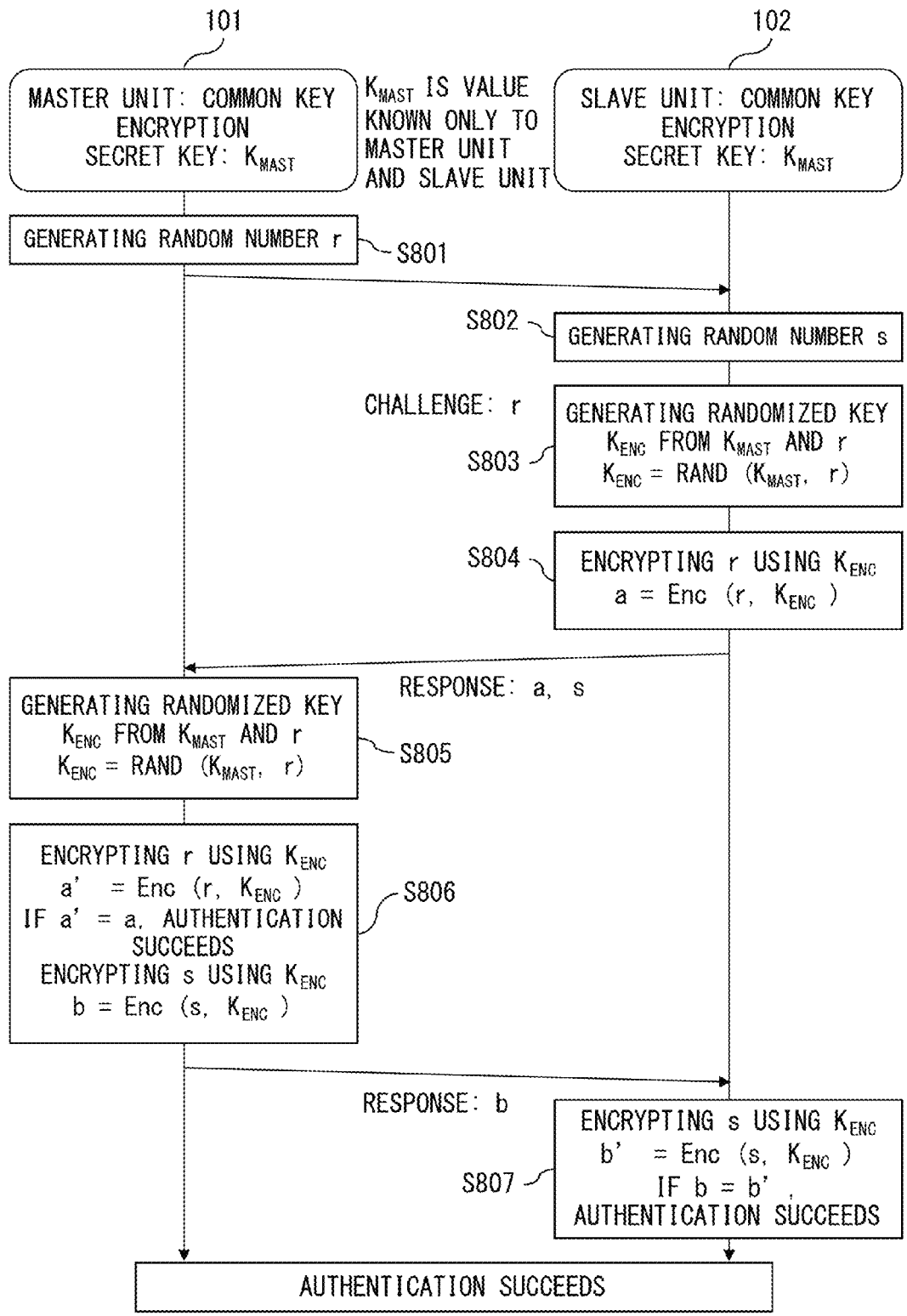
F I G. 1 7

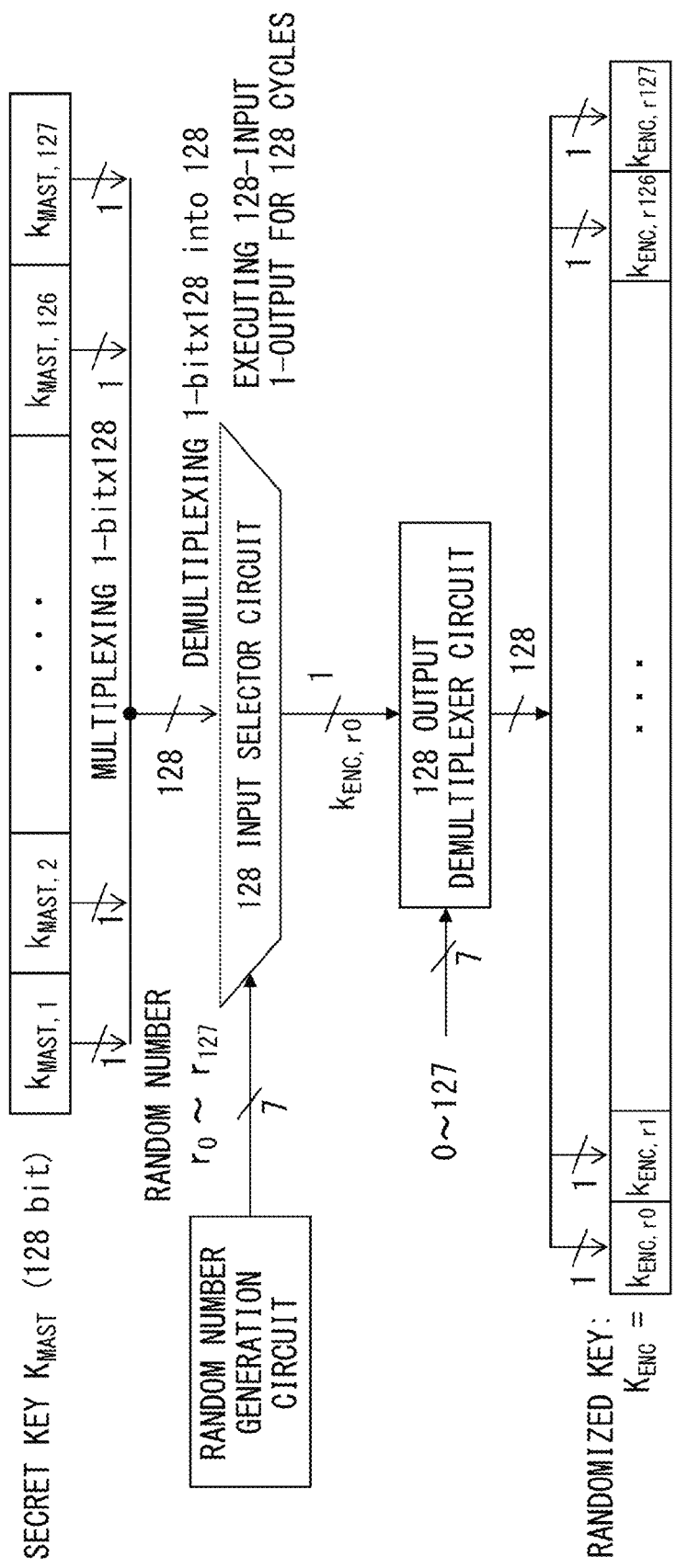
F I G. 20

| TYPE | SCALE (gate/bit) |
|---|---|
| REGISTER | 11 |
| 2-1 SELECTOR (MUX) | 3.5 |
| SHIFT REGISTER/FEEDBACK SHIFT REGISTER | 14.5 |
| GF(2x) RESIDUE CIRCUIT/LFSR | 18 |
| 2-1 AND/OR | 1 |
| 2-1 XOR | 3.5 |
| NOT | 0.5 |
| 2-1 SELECTOR (DEMUX) | 3.5 |

F I G. 2 1

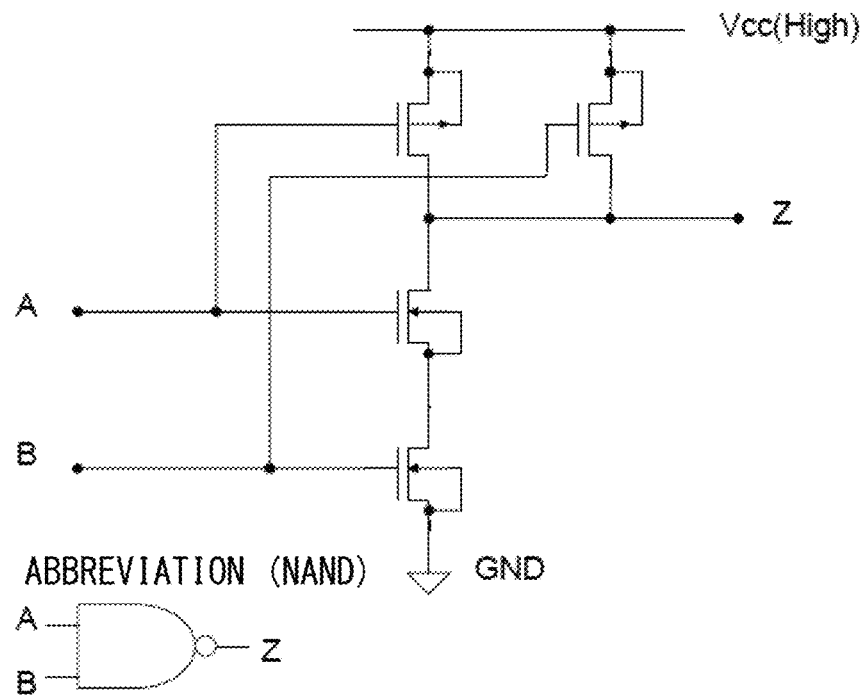
F I G. 2 2

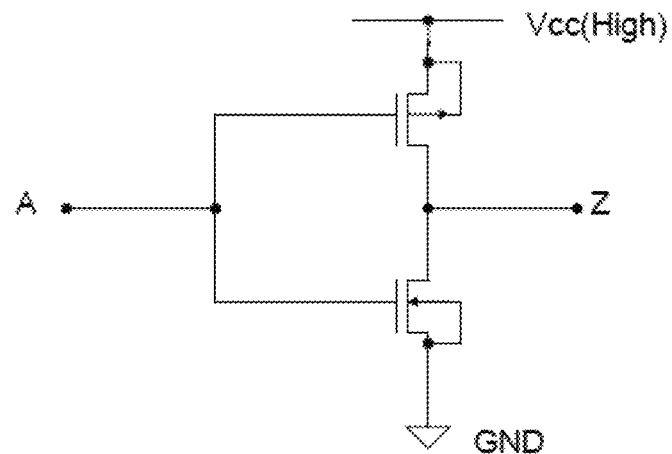
ABBREVIATION (NOT)
FIG. 24

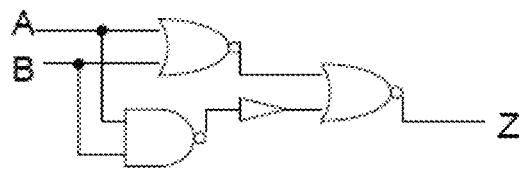
ABBREVIATION (XOR)
FIG. 26

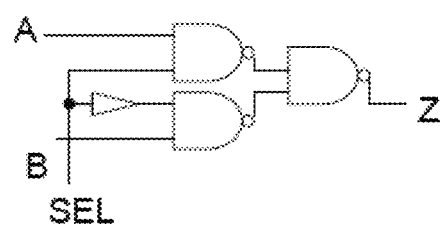
ABBREVIATION (MUX)
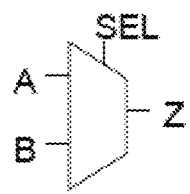
F I G. 27A

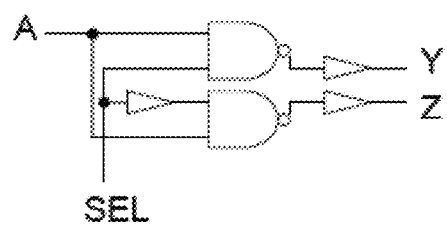
ABBREVIATION (DEMUX)
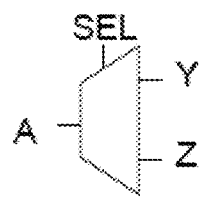
F I G. 27B

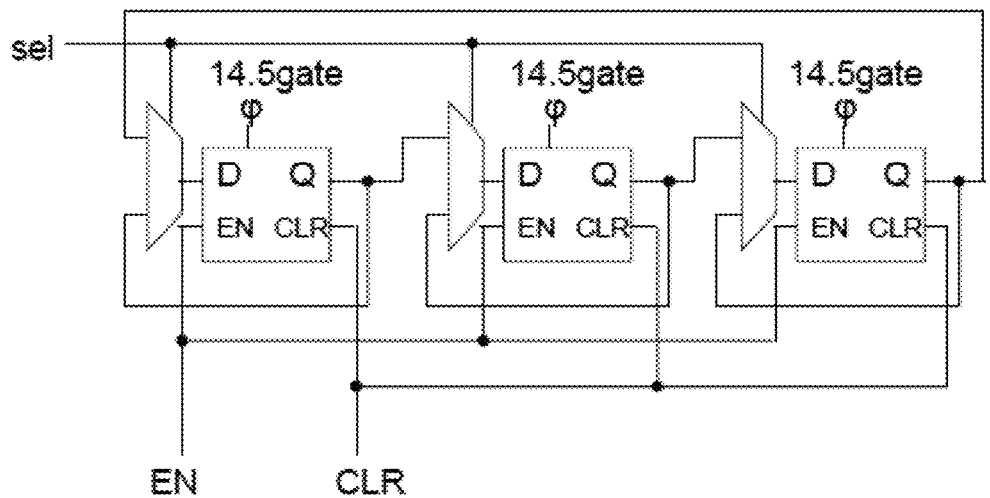
F I G. 2 8

| TYPE | BIT LENGTH | NUMBER | SCALE (kgate) |
|---|---|---|---|
| KEY REGISTER | 128 | 1 | 1.4 |
| 128-1 MUX | 1 | 1 | 0.45 |
| 128-1 DEMUX | 1 | 1 | 0.45 |
| TOTAL | | | 2.3 |

FIG. 30

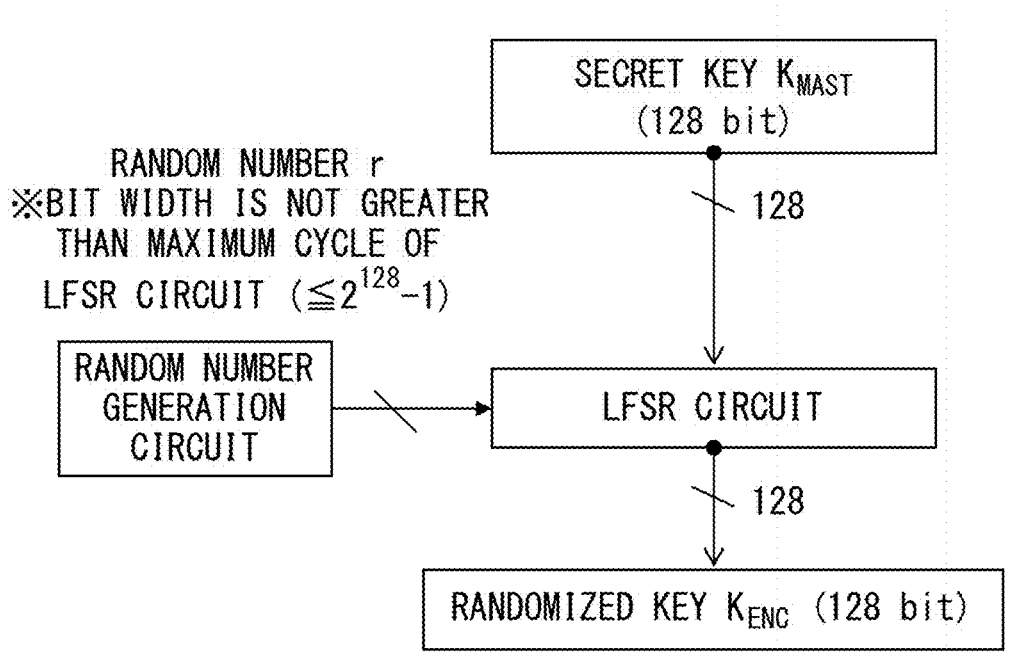
F I G. 3 1

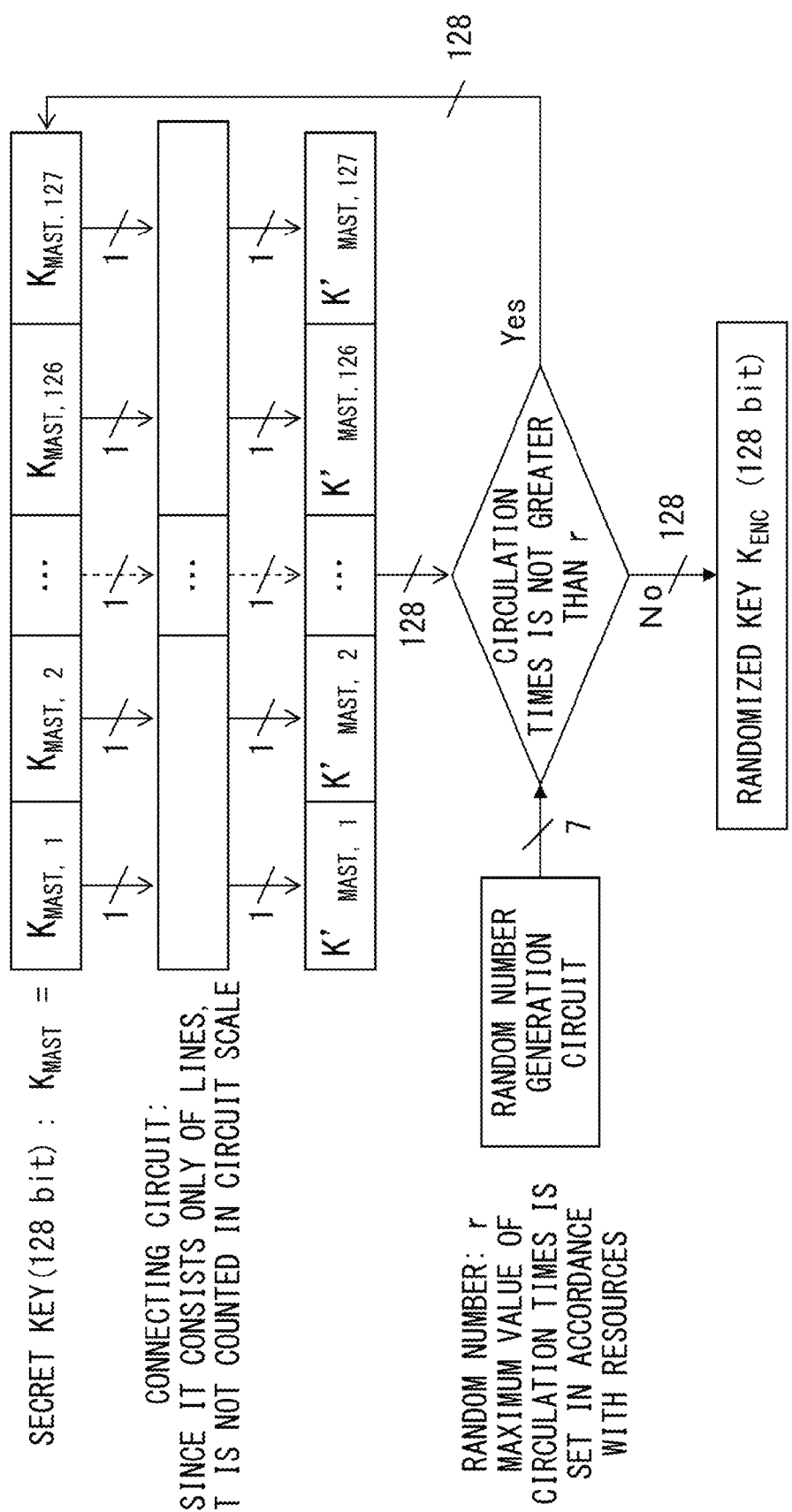
F I G. 3 2

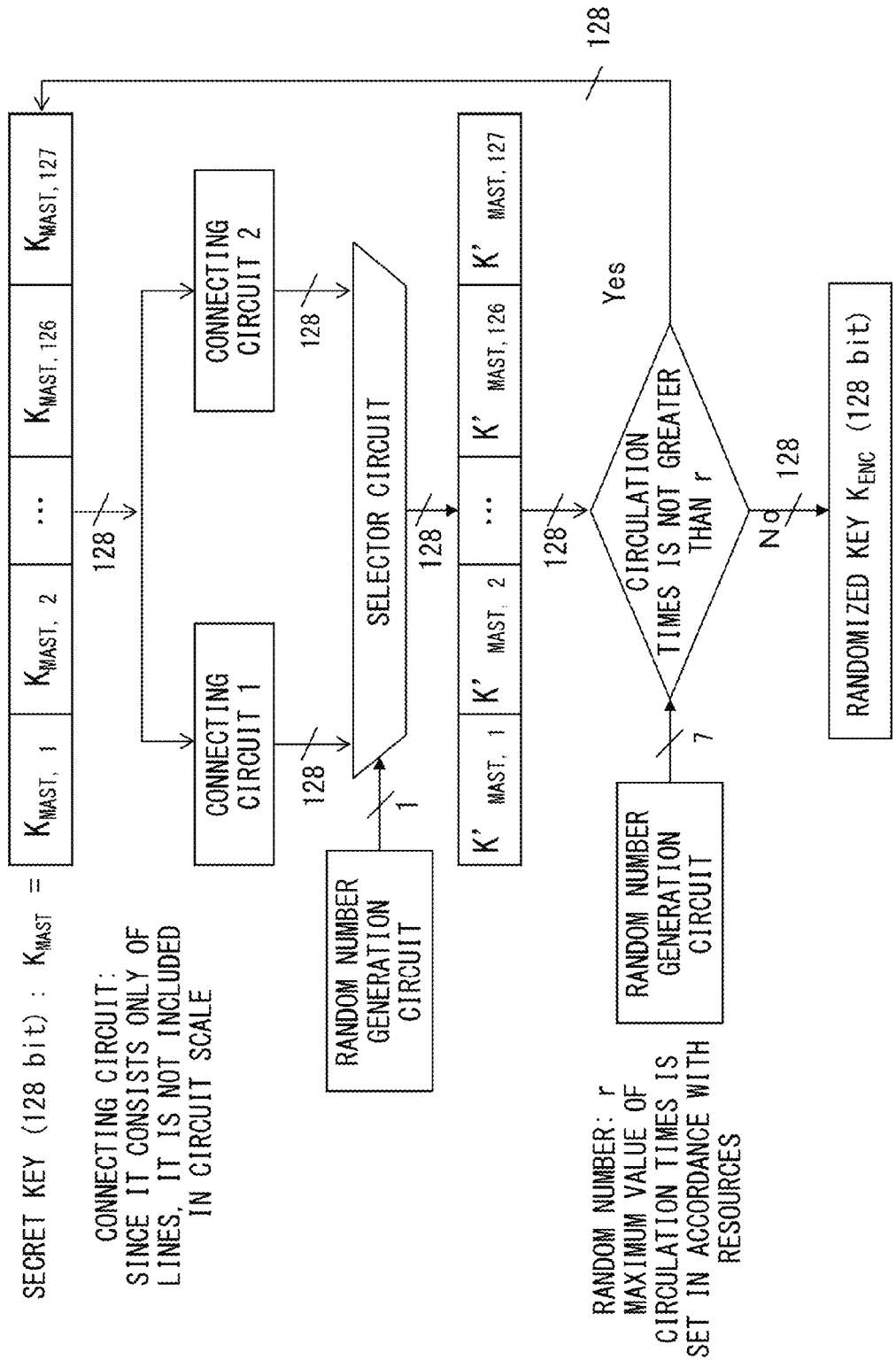
F I G. 33

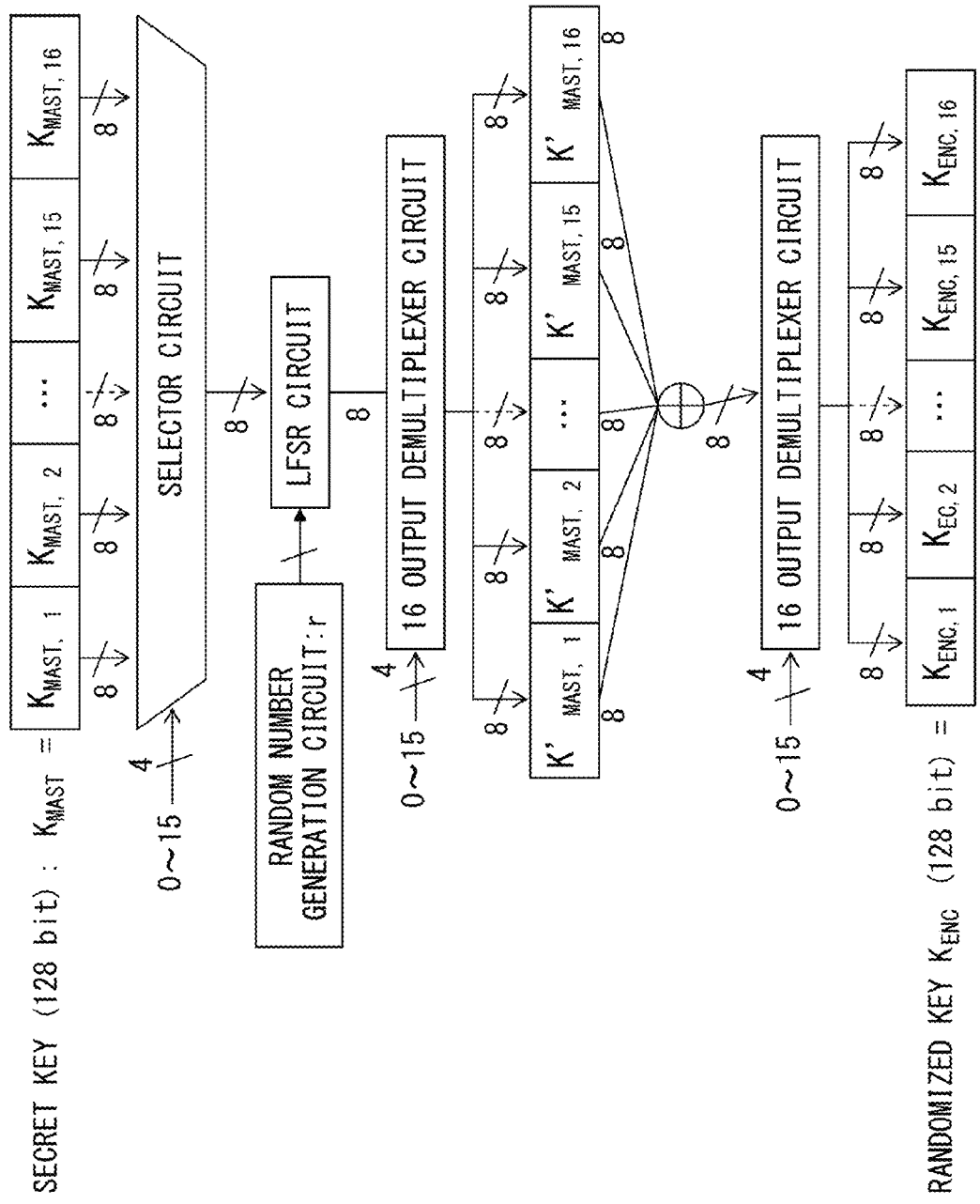
F I G. 35

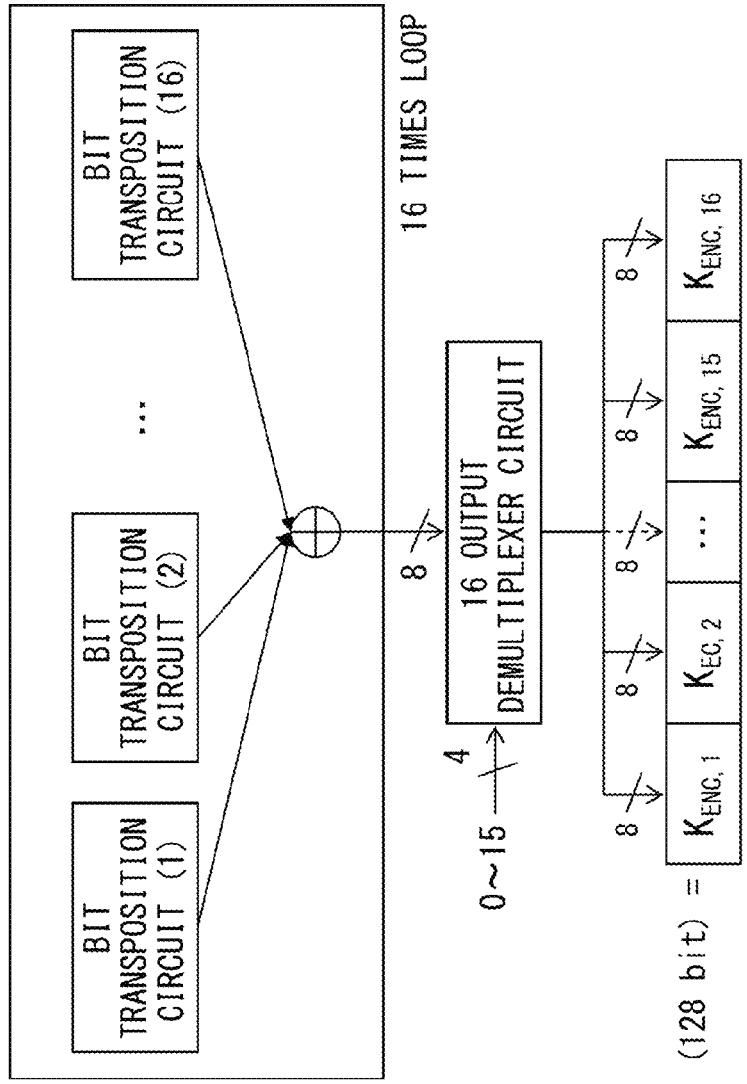

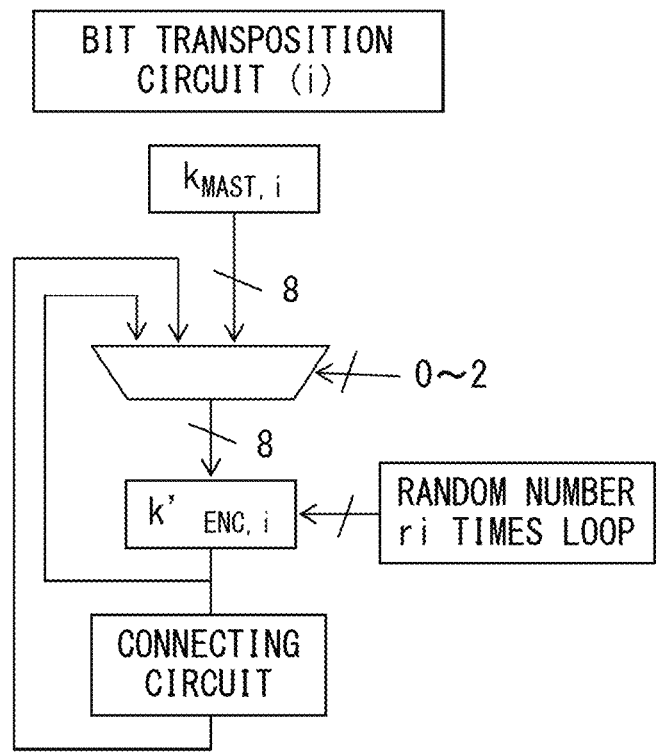
F I G. 3 6 B

| | SCALE (kgate) |
|---|---|
| CONVENTIONAL EXAMPLE (EXCLUSIVE COUNTERMEASURE CIRCUIT) | 17.6 |
| EXAMPLE (1) | 2.2 |
| EXAMPLE (2) | 3.3 |
| EXAMPLE (3) | 1.3 |
| EXAMPLE (4) | 1.7 |
| EXAMPLE (5) | 4.2 |
| EXAMPLE (6) | 4.4 |
| EXAMPLE (7) | 4.3 |

FIG. 37

ENCRYPTION PROCESSING DEVICE AND AUTHENTICATION METHOD

CROSS-REFERENCE TO RELATED APPLICATION

This application is a continuation application of International Application PCT/JP2011/067170 filed on Jul. 27, 2011 and designated the U.S., the entire contents of which are incorporated herein by reference.

FIELD

The present invention relates to an encryption processing device and an authentication method which uses a common key encryption scheme.

BACKGROUND

Recently, encryption devices having authentication functions have been integrated in various objects. For example, such encryption devices are used for authenticating cartridges in printers, and for authenticating disposable parts in medical apparatuses. By using encryption devices, genuine articles and counterfeits may be distinguished, thereby protecting customers from damages caused by low quality counterfeits.

As typical examples of encryption schemes used for authentication functions, a public key encryption scheme and a common key encryption scheme are known. A public key encryption scheme is a scheme which uses different keys for encryption and decryption, and the scheme maintains security by making a key (a secret key) for decrypting encrypted text be secret information only for recipients instead of publicly disclosing a key (a public key) for encrypting the text. On the other hand, a so-called common key encryption scheme is a scheme which uses the same key for encryption and decryption (a secret key), and the scheme maintains security by making the secret key information not known to a third party but only to senders and recipients. Cases for employing both the public key encryption scheme and common key encryption scheme are based on the most important premise that the secret key is not leaked to the outside, in view of security. So long as the premise is secured, authentication is safe regardless of whether the public key encryption or the common key encryption is employed. However, since a circuit scale is smaller in the common key encryption than in the public key encryption and is more suitable for cost reduction, the authentication which uses the common key encryption is widely used, in particular, in embedded equipment.

As a property required for embedded equipment which includes security functions, there is so-called tamper resistance. Tamper resistance means prevention of secret observation and it refers to a property for preventing leakage in important information that is stored in the embedded equipment by information being observed from outside of the embedded equipment. In order to realize tamper resistance, it is necessary to prevent information leakage caused by accesses from regular input/output terminals included in the embedded equipment, and further, it is necessary to prevent information leakage against non-regular accesses which directly secretly observe into internal circuits by using microprobes. A typical hardware configuration of an IC chip cannot absorb such attacks of directly secretly observing into internal circuits with microprobes. Accordingly, in order to realize tamper resistance, it is required to fabricate an IC chip that has a hardware configuration exclusively for preventing physical and logical unauthorized accesses from outside.

As a typical method for realizing safe authentication, a method is employed that writes the secret key used for authentication in tamper resistant authentication equipment when fabricating equipment and that does not fetch the key outside after the fabrication. It has been considered that with this, an unauthorized third party cannot obtain the secret key and counterfeits of authentication equipment may be prevented.

Patent Document 1: Japanese National Publication of International Patent Application No. 2008-526078

Patent Document 2: Japanese Laid-open Patent Publication No. 2010-226707

Patent Document 3: Japanese Laid-open Patent Publication No. 4-117038

Non Patent Document 1: Paul C. Kocher, "Timing Attacks on Implementations of Diffie-Hellman, RSA, DSS, and Other Systems," Advances in cryptology-CRYPTO 1996, Springer-Verlag, pp. 104-113

Non Patent Document 2: Thomas S. Messerges, Ezzy A. Dabbish and Robert H. Sloan, "Power Analysis Attacks of Modular Exponentitiation in Smartcards," Cryptographic Hardware and Embedded Systems (CHES' 99), Springer-Verlag, pp. 144-157

Non Patent Document 3: Paul Kocher, Joshua Jaffe, and Benjamin Jun, "Differential Power Analysis," in proceedings of Advances in Cryptology-CRYPTO '99, Springer-Verlag, 1999, pp. 388-397

Non Patent Document 4: S Chari, C. Jutla, J. R. Rao, P. Rohatgi, "A Cautionary Note Regarding Evaluation of AES Candidates on Smart-Cards," Second Advanced Encryption Standard Candidate Conference, March 1999

Non Patent Document 5: T. S. Messerge, Ezzy A. Dabbish and Robert H. Sloan, "Investigations of Power Attacks on Smartcards," Processings of USENIX Workshop on Smartcard Technology, March 1999

Non Patent Document 6: Thomas S. Messerges, "Securing the AES Finalists Against Power Analysis Attacks," in proceedings of Fast Software Encryption Workshop 2000, Springer-Verlag, April 2000

Non Patent Document 7: Soichi Okada, Naoya Torii, and Takayuki Hasebe, "Experiments of AES hardware for Smartcards", Technical report of IEICE, ISEC 101 (214), pp. 111-118, 2001-07-18

SUMMARY

According to one aspect of the embodiments, an encryption processing device is provided. The encryption processing device includes a memory configured to store a common key, and a processor configured to generate a random number which is an integer, to perform a bit transposition on the common key, the bit transposition being determined at least by the random number, to transmit the random number to another encryption processing device and to receive a response from the other encryption processing device, the response obtained by encryption using a common key stored in the other encryption processing device and a second randomized key generated by performing the bit transposition determined by the random number; and to authenticate the other encryption processing device either by comparing the response with the random number by decrypting the response with the common key, or by comparing the random number with the response by encrypting the random number with the common key.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates another typical processing of a challenge-and-response authentication protocol (bilateral authentication, encryption/decryption) which uses a common key encryption.

FIG. 4 illustrates typical processing (a combination of key XOR processing and a table conversion) of a common key encryption.

FIG. 6 illustrates an example of a differential power curve with a spike.

FIG. 10 illustrates an explanation in processing for generating a randomized key (method 1) which is applied to each embodiment of the present invention.

FIG. 12 illustrates a configuration diagram of an example of a hardware system which may realize a system applied to each embodiment of the present invention.

FIG. 13 illustrates an explanation for another processing for generating a randomized key (method 2) which is applied to each embodiment of the present invention.

FIG. 14 illustrates processing of a challenge-and-response authentication protocol (unilateral authentication, encryption/decryption) according to a first embodiment of the present invention.

FIG. 17 illustrates processing of a challenge-and-response authentication protocol (unilateral authentication, encryption only) according to a fourth embodiment of the present invention.

FIG. 20 illustrates a first example of processing for generating a randomized key.

FIG. 21 illustrates a table of an estimation standard for a circuit scale.

FIG. 22 illustrates an example of a circuit of a 2-1 NAND gate.

FIG. 24 illustrates an example of a circuit of a NOT gate.

FIG. 26 illustrates an example of a circuit of a 2-1 XOR (exclusive OR) gate.

FIG. 27A illustrates an example of a circuit of a 2-1 selector (MUX).

FIG. 27B illustrates an example of a circuit of a 2-1 selector (DEMUX).

FIG. 28 illustrates an example of a circuit of a shift/cyclic register.

FIG. 30 illustrates a table of an estimate of a circuit scale of a first example.

FIG. 31 illustrates a second example of processing for generating a randomized key.

FIG. 32 illustrates a third example of processing for generating a randomized key.

FIG. 33 illustrates a fourth example of processing for generating a randomized key.

FIG. 35 illustrates a sixth example of processing for generating a randomized key.

FIG. 36A illustrates a seventh example of processing for generating a randomized key.

FIG. 36B illustrates a bit transposition circuit in FIG. 36A.

FIG. 37 illustrates a table which indicates a comparison of an increment of a circuit scale for a countermeasure against a side channel attack according to comparative examples and each embodiment.

DESCRIPTION OF EMBODIMENTS

Figure 1:
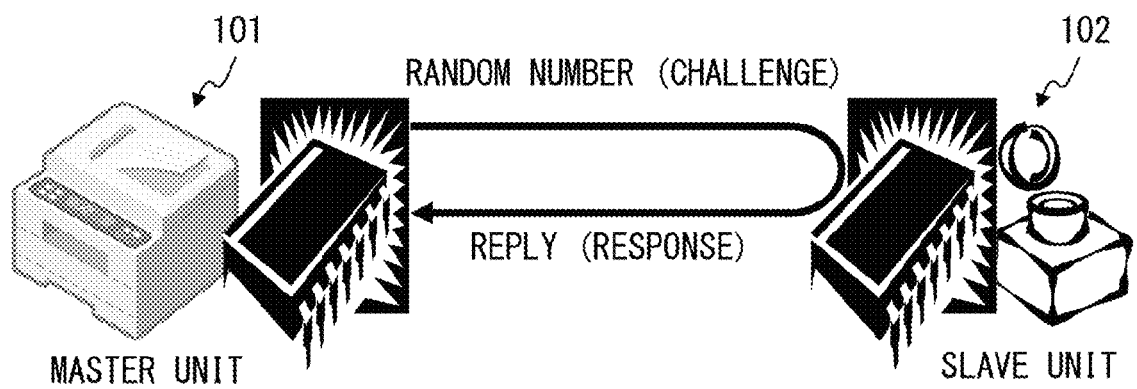
FIG. 1 illustrates an outline of a challenge-and-response authentication protocol.

Hereinafter, explanations are given for the embodiments of an encryption processing device and an authentication method using a common key encryption scheme, in reference to the drawings. First, explanations are given for comparative examples, followed by explaining first to sixth embodiments of the present invention with advantages over the comparative examples included. In the following explanations, over a plurality of drawings, similar components or components with similar functions are allotted similar reference numerals, and except for first appearances, the detailed explanations thereof are omitted.

An authentication chip is used in a system for performing communications among a plurality of pieces of electronic equipment and confirming that communication partners are authentic equipment. For example, the authentication chip is essential in a system which confirms between a printer and an ink cartridge that a cartridge is a genuine component of the manufacturer.

As typical examples of an encryption scheme used for authentication functions, a public key encryption scheme and a common key encryption scheme are known. A public key encryption scheme is a scheme which uses different keys for encryption and decryption, and the scheme maintains security by making a key (a secret key) for decrypting encrypted text be secret information only for recipients instead of publicly disclosing a key (a public key) for encrypting the text. On the other hand, a so-called common key encryption scheme is a scheme which uses the same key for encryption and decryption (a secret key), and the scheme maintains security by making the secret key information not known to a third party, but only to senders and recipients. Cases for employing both the public key encryption scheme and common key encryption scheme are based on the most important premise that the secret key not be leaked to the outside, in view of security. So long as this premise is secured, authentication is safe regardless of whether public key encryption or common key encryption is employed. However, since a circuit scale is smaller in common key encryption than in public key encryption and is more suitable for cost reduction, the authentication which uses common key encryption is widely used, in particular, in embedded equipment.

As a property required for embedded equipment which includes security functions, there is so-called tamper resistance. Tamper resistance means prevention of secret observation and it refers to a property for preventing leakage in important information that is stored in the embedded equipment caused by information being observed from outside of the embedded equipment. In order to realize tamper resistance, it is necessary to prevent information leakage caused by accesses from regular input/output terminals included in the embedded equipment, and further, it is necessary to prevent information leakage against non-regular accesses which directly secretly observe internal circuits by using microprobes. A typical hardware configuration of an IC chip cannot absorb such attacks of directly secretly observing into internal circuits with microprobes. Accordingly, in order to realize tamper resistance, it is necessary to fabricate an IC chip that has a hardware configuration exclusively for preventing physical and logical unauthorized accesses from outside.

As a typical method for realizing safe authentication, a method is employed that writes the secret key used for authentication in tamper resistant authentication equipment when fabricating equipment and that does not fetch the key outside after the fabrication. It has been considered that with this, an unauthorized third party cannot obtain the secret key and counterfeits of authentication equipment may be prevented.

However, the embedded equipment which includes authentication equipment from which the key is not fetched externally after a fabrication is still known to have vulnerability to attacks called side channel attacks which decrypt the secret key by using information observable from the outside without accompanying physical damage in the embedded equipment. In other words, it becomes clear that the secret key has been leaked even for equipment from which the key is not fetched externally after the fabrication. Accordingly, it has become one of the problems to be solved in view of the tamper resistance to provide countermeasures against side channel attacks while suppressing increases in cost.

Side channel attacks are attacks which decrypt the secret key by using information observable from the outside without accompanying physical damage in the embedded equipment. In 1996, timing attacks which observe a processing time period were proposed but they were not major threats since a countermeasure against them was easy. However, in 1998, schemes called power analysis attacks which observe the amount of power consumed were proposed and have been attracting attention even now as major threats. Power analysis attacks are schemes which estimate key information inside by collecting and analyzing power consumption data when various input data are imparted to the embedded equipment. In particular, when the embedded equipment is a single LSI chip such as master card chips, authentication chips, and the like, measurement of consumption power is easy, and accordingly, the countermeasures to power analysis attacks is a major problem to be solved in view of the tamper resistance. It is known that the secret key may be estimated from an encryption processor by using power analysis attacks both for public key encryption and secret key encryption.

There are two types of power analysis attacks, a Single Power Analysis and a Differential Power Analysis. A single power analysis is a scheme which estimates the secret key from the feature of the single power consumption data in the encryption processor, and a differential power analysis is a scheme which estimates the secret key by analyzing differences of many pieces of power consumption data. When restricted to the common key encryption scheme, differential power analysis is known to be an effective attacking method, while single power analysis is essentially ineffective since the countermeasures are easily taken. For example, a decryption method using a differential power analysis against public key encryption such as an RSA and the like is stated in such documents as non-patent document 2 and the like. A decryption method which uses a differential power analysis against a DES (Data Encryption Standard) which is used as a conventional standard in the common key encryption scheme is stated in such documents as non-patent document 3 and the like. In addition to the DES, with regard to an AES (Advanced Encryption Standard) which is currently used as a standard, possibilities of decryption using the differential power analysis are pointed out in such documents as non-patent document 4 and the like.

Decryption technologies using power analysis attacks have been attracting attention as particularly effective methods, and various decryption methods have been studied. In addition, countermeasure technologies for preventing the decryption by the PA have also been developed in addition to the decryption technologies and also attracting attention similarly to the decryption technologies. However, when such countermeasure technologies are used, it is known that a disadvantage arises wherein the scale of the circuit which performs decryption processing becomes large, and a countermeasure circuit exclusive for the common key encryption scheme requires the circuit scale to be twice as large as the countermeasure-not-taken circuit. In small-sized chips such as authentication chips or smartcards, a ratio occupied by the encryption circuit is very large and it is not preferable since the cost is easily increased by integration of an exclusive countermeasure circuit.

In the following embodiment, by improving an authentication protocol of a high-order layer which utilizes encryption instead of using an exclusive countermeasure circuit, an authentication chip is realized which has a countermeasure and which has a circuit scale of the same degree as the countermeasure-not-taken circuit without causing an increase in cost caused by the exclusive countermeasure circuit. In the following embodiment, a randomized key is generated by using the circuit in which a bit transposition condition changes in accordance with random numbers and using the randomized key instead of using the secret key, thereby obtaining a device for processing encryption which achieves both security against side channel attacks and small-scaled and rapid encryption processing.

Challenge-and-Response Authentication Protocol

In authentication, a communication protocol called a challenge-and-response authentication protocol is utilized in order to confirm authenticity of the equipment.

FIG. 1 illustrates an outline of a challenge-and-response authentication protocol. Challenge-and-response authentication is a password which uses digital information in which random numbers called "a challenge" are transmitted from an authentication side (a master unit 101) to an authenticated side (a slave unit 102). On the other hand, at the side of the slave unit 102, a reply called "a response" is generated and it is given to the master unit 101. The master unit 101 judges the value of "a response" to "a challenge" and when the value is correct, the master unit 101 judges that the slave unit 102 is authentic equipment.

By using a random number as "a challenge", a corresponding "response" changes every time. With this, a prevention countermeasure against "replay attacks" is provided. Replay attacks are attacks which pretend to be authentic equipment by repeating replies observed from the outside in the past. In other words, when the random number is not used, a pair of the challenge and response becomes completely fixed, and the attacker, by observing the pair, can know an appropriate response which corresponds to a challenge, and as a result, chip counterfeits are easily made by fabricating chips which send back the response.

Figure 2:
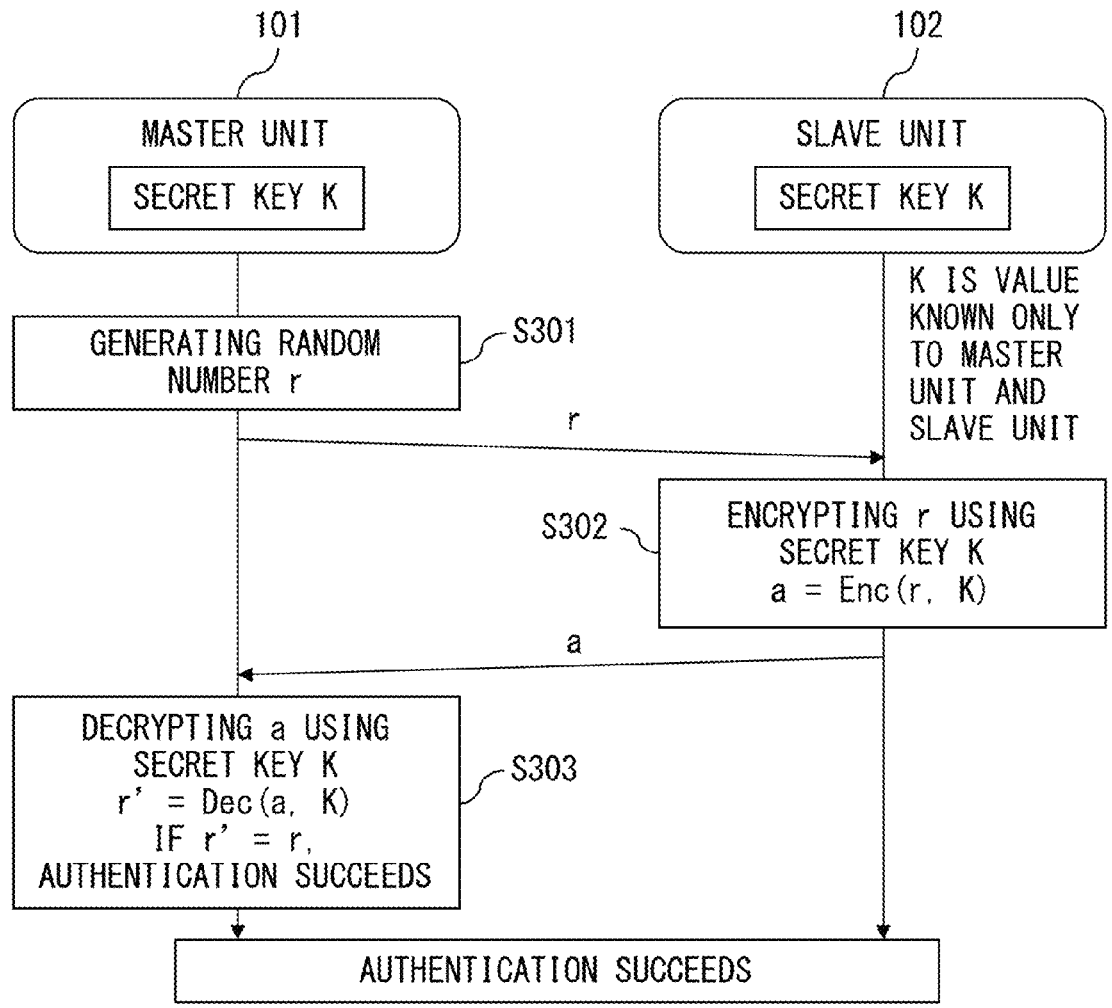
FIG. 2 illustrates typical processing of a challenge-and-response authentication protocol (unilateral authentication, encryption/decryption) which uses a common key encryption.

FIG. 2 illustrates a challenge-and-response authentication method (protocol) which uses a common key encryption scheme. In the generation of "a response" to "a challenge", a method which employs encryption functions is typical. There are merits and demerits depending on selections of encryption functions, but in the case of an authentication chip, a method of using a common key encryption realizable by a circuit which is smaller than a public key encryption is widely used.

In a protocol as illustrated in FIG. 2, a secret key K is commonly shared beforehand between authentication chips of a master unit 101 and a slave unit 102. This may be realized by writing in the value of the secret key (common key) K at the time of fabricating a chip which is mounted in the master unit 101 and the slave unit 102. It is the most important premise in view of security that the value of the secret key K not be leaked outside.

In step S301, the master unit 101 which is the authentication side generates a random number r and transmits it to the slave unit 102 which is the authenticated side. In step S302, first, the slave unit 102 receives the random number r from the master unit 101. Further, the slave unit 102 executes encryption processing Enc (r, K) to the random number r received from the master unit 101 by using a secret key K and returns to the master unit 101 a value obtained by the encryption processing as a reply a=Enc (r, K). However, C=Enc (P, K) indicates that a result of a plain text P encrypted by the key K using the common key K is an encryption text C. In step S303, the master unit 101 which received the reply a executes decryption processing Dec (a, K) using the secret key K and sets a value obtained by the decryption processing as a decryption result r'=Dec (a, K). Then a decryption result r' and the random number r generated in step S301 are compared. When the decryption result r' and the random number r are matched, the master unit 101 recognizes that the slave unit 102 is a piece of authentic equipment. It is only in the case where the slave unit 102 has the same key K as the secret key K owned by the master unit 101 that the slave unit 102 may generate an authentic reply a which corresponds to the random number r.

Although a protocol illustrated in FIG. 2 uses both encryption and decryption, there is a method which uses only encryption. In such a case, challenge-and-response authentication may be realized as both the master unit 101 and the slave unit 102 execute encryption processing Enc (r, K) by a secret key K to the random number r thereby confirming that the encryption text are matched between the two units at the side of the master unit 101.

FIG. 3 illustrates another typical processing of a challenge-and-response authentication protocol (bilateral authentication, encryption/decryption) which uses a common key encryption. A scheme illustrated in FIG. 2 is called a unilateral authentication and it is an authentication protocol for confirming the authenticity of the slave unit 102 by the master unit 101. Since the slave unit 102 cannot authenticate the authenticity of the master unit 101 with the scheme, the slave unit 102 cannot prevent a fraud of the master unit 101. In order to prevent the fraud, the slave unit 102 is required to have means for confirming the authenticity of the master unit 101. An authentication protocol called bilateral authentication realizes the means for confirming the authenticity of the master unit 101. In the bilateral authentication protocol, the slave unit 102 transmits a challenge to the master unit 101, and processing of confirming the reply from the master unit 101 is performed. The authentication protocol is illustrated in FIG. 3, in which the authentication protocol of FIG. 2 is extended to be a bilateral authentication.

In step S401, similarly to step S301 of FIG. 2, the master unit 101 generates the random number r and transmits it to the slave unit 102. In step S403, the slave unit 102 which received the random number r executes Enc (r, K), which is the encryption processing using the secret key K. In addition, the slave unit 102 generates the random number s in step S402. The order of processing of steps S402 and S403 is discretional, or steps S402 and S403 may be processed in parallel. Then, a value obtained by the encryption processing is returned to the master unit 101 together with the random number s as a reply a=Enc (r, K). In step S404, the master unit 101 which received the reply a executes Dec (a, K), which is the decryption processing using the secret key K, and sets a value obtained by the decryption processing as r'=Dec (a, K). Then, the decryption result r' and the random number r generated in step S401 are compared. When the decryption result r' and the random number r are matched, the master unit 101 recognizes that the slave unit 102 is apiece of authentic equipment. In step S404, the value b=Enc (s, K) obtained by the encryption processing which executes the encryption processing Enc (s, K) using the secret key K is transmitted to the slave unit 102. In step S405, the slave unit 102 which received the value b from the master unit 101 executes decryption processing Dec (b, K) using the secret key K and sets a value obtained by the decryption processing as a decryption result s'=Dec (b, K). Then, the decryption result s' and the random number s generated in step S402 are compared. When the decryption result s' and the random number s are matched, the slave unit 102 recognizes that the master unit 101 is a piece of authentic equipment. In this case, similarly to the case of the unilateral authentication, authentication may be performed by using only the encryption.

Method for Decrypting Secret Key by Differential Power Analysis for Common Key Encryption Circuit FIG. 4 illustrates typical processing (a combination of key XOR processing and a table conversion) of a common key encryption. M is input data such as plain text (or encryption text) and K is an extended key. K in FIG. 4 is a value which is generated by extending a bit length by performing specific processing on the secret key. An exclusive OR (XOR) result of M and K is divided for each specific bit length data and to each divided data, and a conversion table operation called an Sbox is carried out. The value of M and K differs for each common key and for example, in the case of a Data Encryption Standard (DES), it has 48 bits and in the case of an Advanced Encryption Standard (AES), it has 128 bits. Although the bit length of the Sbox depends on encryption type, in the case of the DES, for example, it is a 6-bit input and a 4-bit output. In the case of the AES, it is an 8-bit input and an 8-bit output. Since the circuit scale of the Sbox with an a-bit input and a b-bit output is $a \times b \times 2^a$ times as large compared with a 1-bit input and a 1-bit output, it rapidly increases as the bit length of the input and output increases. Therefore, it is known that the bit strength of an 8-bit input and an 88-bit output is the largest as the bit length of the input and the output of the Sbox.

A predetermined bit of a plain text M, an extended key K, an input of the Sbox, and an output of the Sbox related to one table conversion $w_j$ of one table of the Sbox illustrated in FIG. 4 is set as $m_i$, $k_i$, $x_i$, and $z_i$, respectively. Here, estimating a predetermined bit of the extended key $k_i$ is considered under the presupposition that a predetermined bit of the plain text and the conversion table $m_i$ and $w_i$ is respectively known as a measurable amount.

In general, a power consumption of an encryption device is considered to be proportionate to a Humming weight of input and output data value. Experimental results indicating that this is correct are disclosed in such documents as non-patent document 5 and the like. In the differential power analysis, by acquiring many power consumption waveforms of the encryption device and analyzing them, a secret key is estimated. For example, in non-patent document 6, it is pointed out that at least 100 or more power waveforms are required for removing noise.

Hereinafter, explanations are given for decrypting a secret key by a differential power analysis.

Figure 5:
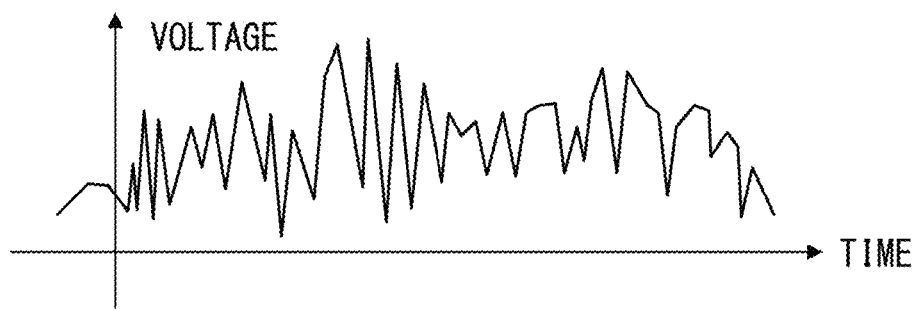
FIG. 5 illustrates an example of a power consumption curve.

The differential power analysis consists of two stages measuring power consumption data and analyzing differential power data. The measurement of the power consumption data, depending on information already known to an attacker, may be performed at A, B, or C in FIG. 4. For example, in a situation where an input M is already known and controllable, a conversion table $w_j$ of the Sbox is also already known, and an extended key K is not known but is fixed, a power consumption data is measured at a point A of FIG. 4. In a situation where an input M is already known and controllable and an extended key K is not known but is fixed, a power consumption data is measured at a point B or a point C of FIG. 4. The attacker observes the power consumption waveform when the input data (plain text) is encrypted with the secret key K, with an oscilloscope or the like. FIG. 5 illustrates an example of a power consumption curve thus obtained. Such measurements of different plain text are repeated a statistically sufficient number of times. A group of a plurality of power consumption curves obtained by the measurements is set as G.

Next, explanations are given for an analysis of power consumption curves. Although the secret key K is not known, the plain text and algorithm are set as already known, and accordingly, it is presupposed that a secret key is K' and a currently targeted bit of the secret key K' is $k_i'$. From the already known $m_i$ and $w_i$, and the presupposed $k_i'$, the output of $z_i'=w_i'(m_i \text{ XOR } k_i')$ is operated and the group $G(k_i')$ for k is divided into subgroups $G_0(k_i')$ and $G_1(k_i')$.

$$G_0(k_i') = \{\text{bit value of } e^{th} \text{ digit of } G|z_i' = w_i'(m_i \oplus k_i') = 0\} \quad (1)$$

$$G_1(k_i') = \{\text{bit value of } e^{th} \text{ digit of } G|z_i' = w_i'(m_i \oplus k_i') = 1\} \quad (2)$$

Here, e is a natural number and the bit value of the $e^{th}$ digit indicates the $e^{th}$ lowest bit (LSB).

The differential DG $(k_i')$ of two groups $G_0(k_i')$ and $G_1(k_i')$ of expressions (1) and (2) is defined as follows.

$$DG(k_i') = (\text{average of power consumption curve which belongs to } G_1) - (\text{average of power consumption curve which belongs to } G_0) \quad (3)$$

FIG. 5 illustrates an example of an average power consumption curve obtained by averaging a power consumption curve which belongs to $G_0(k_i')$ or $G_1(k_i')$. Such an average power consumption curve is obtained for two groups $G_0(k_i')$ and $G_1(k_i')$. The differential DG $(k_i')$ is a difference between the two.

Here, a consideration is made for what kind of a curve the differential DG $(k_i')$ becomes. When $k_i'=k_i$, that is, when an element value $k_i'$ of a presupposed key and an element value $k_i$ of a true key are matched, a Humming weight of the output $z_i$ of the Sbox which belongs to a subgroup $G_0(k_i')$ of a group $G(k_i')$ is 0. The reason is that a presupposed $z_i'=w_i'(m_i \text{ XOR } k_i')$ matches up with regard to a true $z_i=w_i(m_i \text{ XOR } k_i)$ corresponding thereto and all $m_i$. The Humming weight of the output $z_i$ of the Sbox which belongs to a subgroup $(k_i')$ of a group $G(k_i')$ is 1. In conclusion, when $k_i'=k_i$, $$(\text{Average } HW \text{ of } z_i \text{ which belongs to } G_1) - (\text{average } HW \text{ of } z_i \text{ which belongs to } G_0) = 1 \quad (4)$$

As illustrated in FIG. 6, the result brings about an appearance of a spike in the differential power consumption curve.

On the other hand, when $k_i' \neq k_i$, that is, when an element value $k_i'$ of a presupposed key and an element value $k_i$ of a true key are not matched, a presupposed $z_i'=w_i(m_i \text{ XOR } k_i')$ and a true $z_i=w_i(m_i \text{ XOR } k_i)$ corresponding thereto do not have any relationship. Accordingly, in both $G_0(k_i')$ and $G_1(k_i')$, the presupposed $z_i'$ and corresponding true $z_i$ come to have no relationship and are therefore expressed as follows.

$$(\text{Average } HW \text{ of } z_i \text{ which belongs to } G_1) - (\text{average of } HW \text{ of } z_i \text{ which belongs to } G_0) \approx 0. \quad (5)$$

Figure 7:
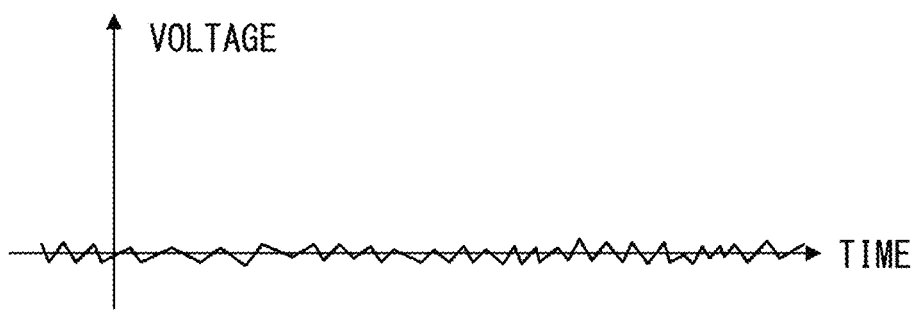
FIG. 7 illustrates an example of a differential power curve without a spike.

FIG. 7 illustrates an example of a differential power consumption curve when $k_i' \neq k_i$. The differential power consumption curve when $k_i' \neq k_i$ becomes a substantially flat curve.

When an analysis which presupposes an element value $k_i'$ of the key is performed for each i as mentioned above, all elements of the secret key K may be decrypted eventually.

Figure 8:
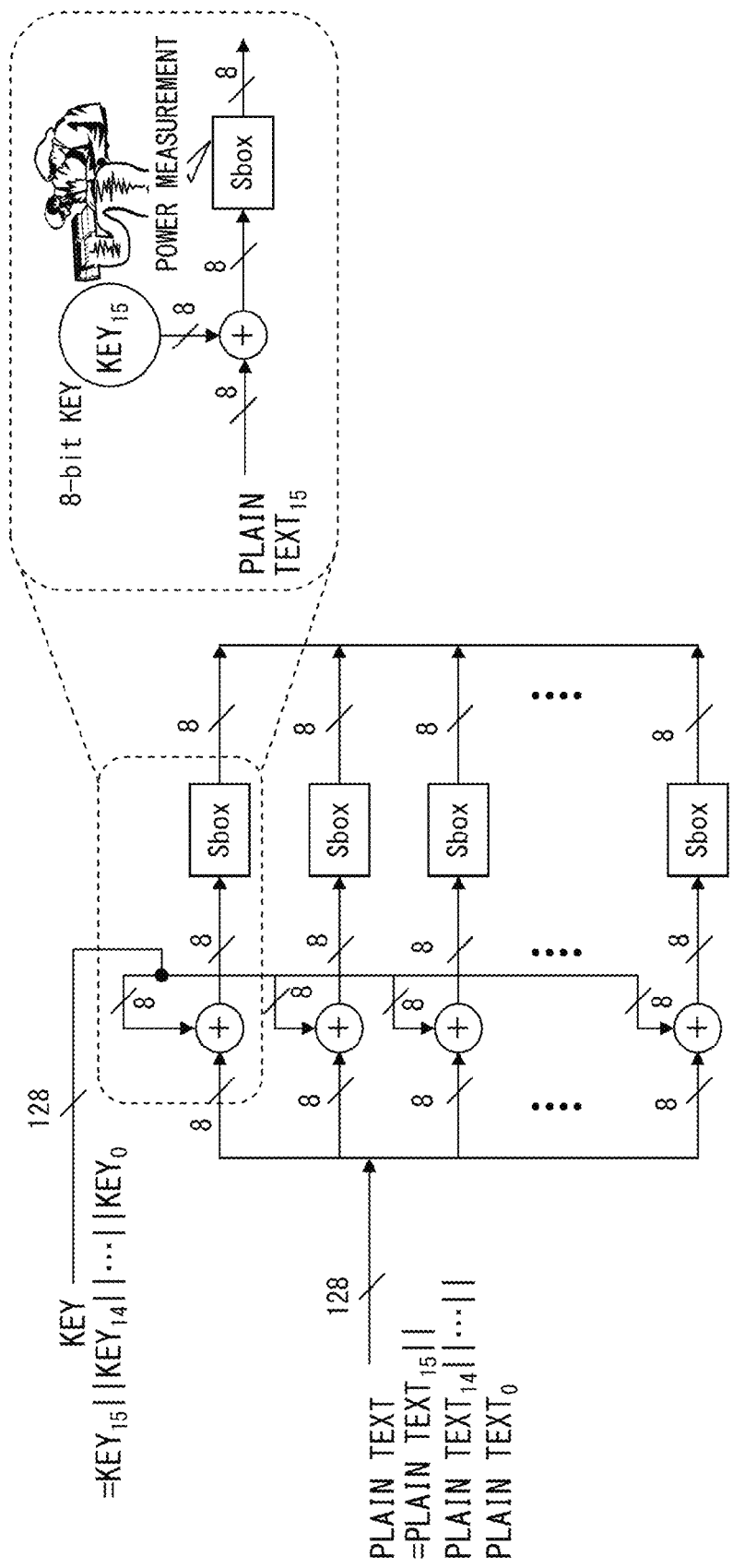
FIG. 8 illustrates an explanation for a factor for a successful side channel attack in an AES.

FIG. 8 illustrates an explanation for a factor for performing a successful side channel attack in an AES. In typical encryption processing in the AES, a 128-bit extended key K, after 128-bit plain text and the XOR have been obtained, is divided into 16 parts of 8 bits each and each data divided into 16 is input in the Sbox. The attacker, by utilizing the consumption power data of each Sbox, executes a brute-force attack respectively for each 8-bit partial key $k_i$ of the extended key $K=k_{15}||k_{14}|| \ldots ||k_0|$ which is divided into 8 bit parts. In other words, although a brute-force attack must be performed $2^{128}$ times against the 128-bit key under ordinary circumstances, the attacker may reduce the number of times down to $2^8$ times 16, that is, $2^8 \times 16 = 2^{12}$, by using a side channel attack. In other words, the time and effort required for a side channel attack depends on a bit length of a partial key which is related to an input of the Sbox. Even though the bit length changes in accordance with the common key encryption scheme, an 8-bit length of the AES is the largest, as was already mentioned.

Explanations have been given for a DPA for the simplest common key encryption circuit, as illustrated in FIG. 4. Such a method is also established when a linear conversion is inserted before or after the key XOR processing, or before and after the key XOR processing of FIG. 4.

Masking Method as Differential Power Analysis
Countermeasure Method for Common Key
Encryption Circuit As a conventional DPA countermeasure method, there is a method of providing countermeasures to encryption processing and randomizing an amount of power consumed. As a typical example of the method, a method which is called "a masking method" is known (for example, please refer to non-patent document 7. Hereafter called "Comparative Example 1").

When data calculated in the encryption processing without a power analysis attack countermeasure is set as M, DPA countermeasures described in Comparative Example 1 are a method of performing encryption processing by calculating data M' and R in the following expression, instead of calculating data M.

$$M'=M\oplus R \qquad (6)$$

Here, R is a random number and is the value which is generated every time the encryption processing is executed. With this method, data of the encryption processing is masked by a random value. Accordingly, as data is randomized, the amount of power consumed is also randomized, and therefore, safe processing may be realized in the DPA. The problem with this method is that the circuit scale is twice as large as that of the countermeasure-not-taken circuit is needed, since both M' and R should be calculated.

When applying the above method to DPA countermeasures in the AES, the encryption processing is performed by calculating data $M_i'$ and $R_i$ expressed as $$M_i'=M_i\oplus R_i \qquad (7)$$

instead of expression (6), setting a part of the plain text M and a random number R related to the partial key $k_i$ as $M_i$ and $R_i$, respectively. In this case, since the data value calculated for each encryption processing is random, safe processing may be realized in the DPA. However, the problem with this method is that the circuit scale twice as large as that of the countermeasure-not-taken circuit is needed, since both $M_i'$ and $R_i$ should be calculated.

When an exclusive countermeasure-taken encryption circuit as illustrated in Comparative Example 1 is used, instead of randomizing the amount of power consumed, the circuit scale gets larger than that of the countermeasure-not-taken encryption circuit. In Comparative Example 1, a circuit for executing a Rijndael algorithm is configured. The circuit scale is evaluated as 17.6 K gate. When a key length is made exclusive for a 128-bit length, the circuit scale is reduced by about 2.2 K gate. However, an increase in the circuit scale of 10 K gate or greater is estimated by performing side-channel attack countermeasures.

As a result of this, a method is requested for realizing safe processing against a side channel attack by improving the authentication protocol of a layer having a higher order than encryption. In this case, since the encryption circuit per se uses the countermeasure-not-taken circuit as is, it can prevent an excessive increase in the circuit scale by power analysis attack countermeasures. Since an authentication protocol is processing which accompanies a random number, by appropriately utilizing the random number, a method which is safe against a side channel attack may be considered. In other words, although the encryption processing is performed on the fixed secret key K in the typical challenge-and-response authentication protocol as illustrated in FIG. 2 to FIG. 3, it is vulnerable to a side channel attack. This disadvantage seems to be overcome by masking the secret key with the random number.

Figure 9:
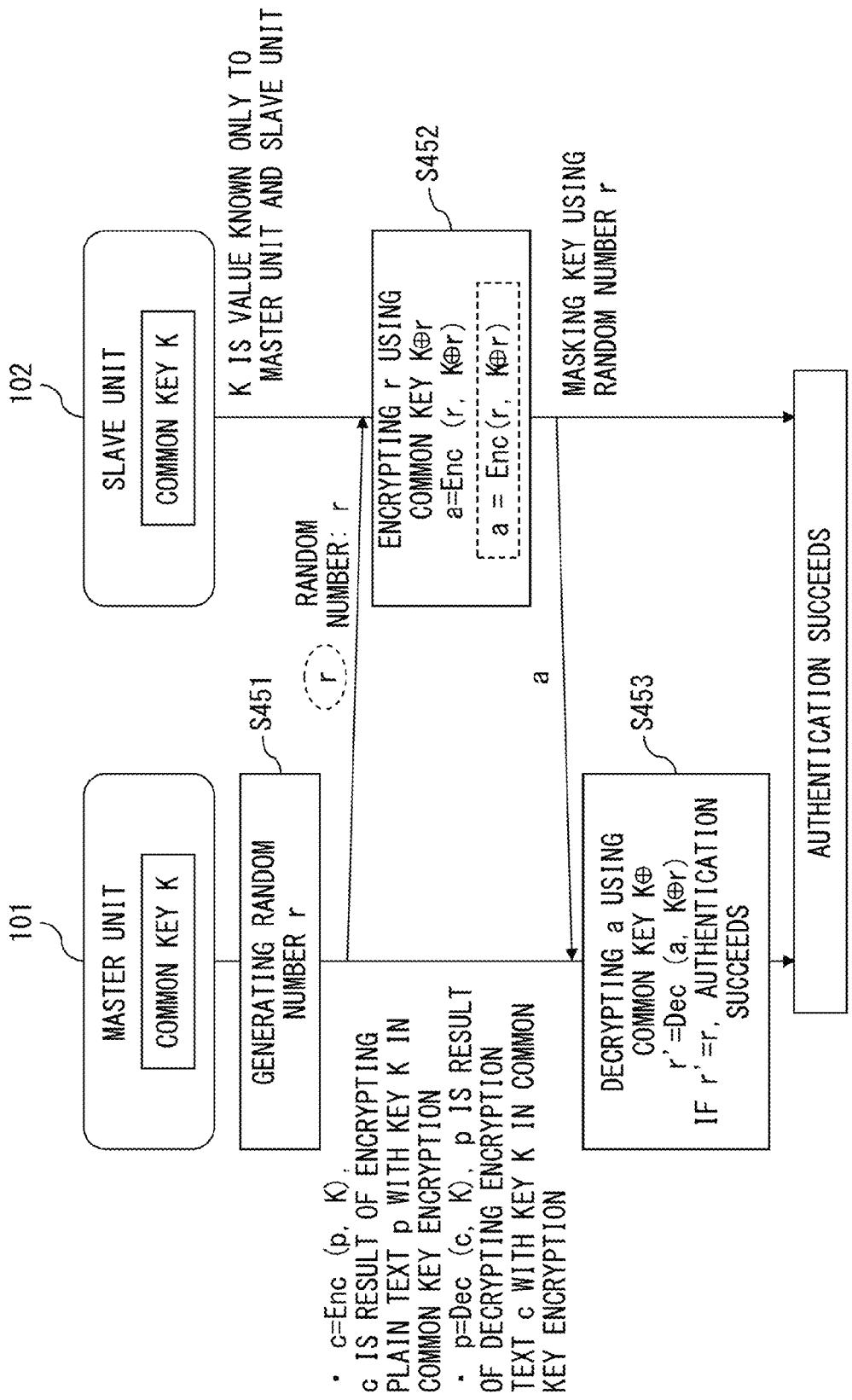
FIG. 9 illustrates processing of an example of an authentication protocol (unilateral authentication, encryption/decryption) by simply randomizing a key.

Comparative Example of Power Analysis Countermeasure Method by Simply Randomizing Secret Key FIG. 9 is a functional block diagram of an example of an authentication protocol (unilateral authentication, encryption/decryption) by simply randomizing a key. In a method illustrated in FIG. 9, in a challenge-and-response authentication protocol using common key encryption illustrated in FIG. 2, by applying a masking method, $$K'=K\oplus r \qquad (8)$$

is used instead of a key K

In step S451, the master unit 101 which performs authentication generates a random number r and transmits it to the slave unit 102 which is the authenticated side. In step S452, first, the slave unit 102 receives the random number r from the master unit 101. Further, the slave unit 102 executes encryption processing Enc (r, K') to the random number r received from the master unit 101 by using a secret key K and returns to the master unit 101 a value obtained by the encryption processing as a reply a=Enc (r, K'). The reply a is generated by masking the secret key K with the random number r. In step S453, the master unit 101, which received the reply a, executes decryption processing Dec (a, K) using the secret key K' and sets a value obtained by the decryption processing as a decryption result r'=Dec (a, K'). Then a decryption result r' and the random number r generated in step S501 are compared. When the decryption result r' and the random number r are matched, the master unit 101 recognizes that the slave unit 102 is a piece of authentic equipment. It is only in the case where the slave unit 102 has the secret key K that the slave unit 102 may generate an authentic reply a, which corresponds to the random number r.

Although it seems that the above-mentioned method would be safe against a side channel attack by randomizing a key, it is not always safe but actually vulnerable to the attack for the following reasons. In this method, the random number r is transmitted and received between the master unit 101 and the slave unit 102, and as a result, it is commonly shared between the master unit 101 and the slave unit 102. In other words, it should be considered that the random number r is easily observed from the outside. When the random number r is observed by the attacker, the attacker can decrypt the key K by using a differential power analysis.

In addition, several modifications have been considered for the method. In the above method, the random number r may be observed from the outside by being transmitted and received between the master unit 101 and the slave unit 102. Making the variable used for masking be another variable instead of a random number r would then for example be considered. Using the random number r and K' of expression (8) to generate $m_r$=Enc (r, K') and masking the secret key K by using the $m_r$ would also be considered. However, in this case, the generation of $m_r$ is performed before the generation of the reply, and therefore, it is possible that the secret key K would be decrypted by using the same method as mentioned above and by measuring the amount of power consumed in processing for generating $m_r$.

Thus, although it seems possible to overcome vulnerability to the side channel attack by using the random number r and masking the secret key K, it has become clear that it is not always so.

General Explanations

In reference to FIG. 10 to FIG. 18, general explanations are hereafter given.

As already mentioned above, even when the random number used in a challenge-and-response protocol is used for masking the secret key as is, safe authentication processing may not be realized against a side channel attack. In order to overcome this problem, in the following embodiments, the following operational procedure (called method 1) is executed.
(Operation 1-1) by using a circuit in which a bit transposition condition changes for each random number, performing a bit transposition on the secret key $K_{MAST}$ to generate a randomized key $K_{ENC}$.
(Operation 1-2) Using the randomized key $K_{ENC}$ instead of using the secret key $K_{MAST}$.

A basic idea for the operation lies in randomizing the secret key by using the random number and using the randomized secret key as a new secret key. The idea is based on the premise that the random number used in the challenge-and-response authentication will inevitably be observed from the outside, and even when the random number is observed, it can cause the attacker more time and effort to the attacker in the side channel attack. The randomization of the key in each embodiment explained hereafter fulfills the following conditions.
(Condition 1) When the value of the secret key and the random number shared between the master unit and the slave unit are found, the value of the randomized key is also found.
(Condition 2) Unless the value of the secret key and the random number shared between the master unit and the slave unit are found, the value of the randomized key will not be found.

Thus, in the above method, unless the value of the secret key and the random number shared between the master unit and the slave unit are found simultaneously, it will be impossible to decrypt the randomized key. Generally speaking, simultaneously finding the secret key embedded at the time of fabricating equipment and a random number which will change on different occasions requires tremendous time and effort, and therefore, it may be unrealistic to break the challenge-and-response authentication.

FIG. 10 illustrates an explanation for processing for generating a randomized key (method 1) which is applied to each embodiment. Here, although a secret key is a 128-bit secret key, it is not necessary to be a 128-bit secret key. A secret key may be a 48-bit secret key, for example.

The 128-bit secret key $K_{MAST}$ stored in a memory 1001 and a random number r generated in a random number generation circuit 1003 are input in a bit transposition circuit 1002. In the bit transposition circuit 1002, by using a bit transposition which depends on the input random number r, a 128-bit randomized key $K_{ENC}$ is generated from the 128-bit secret key $K_{MAST}$ (operation 1-1). A specific method for a bit transposition is mentioned later.

The generated randomized key $K_{ENC}$ is used in the challenge-and-response authentication protocol for which explanations are hereafter given in reference to FIG. 14 to FIG. 19 (operation 1-2). The challenge-and-response authentication protocol illustrated in FIG. 14 to FIG. 19 mainly differs from the challenge-and-response authentication protocol illustrated in FIG. 2 and FIG. 3, in that the former uses a randomized key $K_{ENC}$ instead of using the original secret key $K_{MAST}$. By executing randomized key compression as illustrated in the above operations (1-1) to (1-2) instead of executing simple randomization, side-channel attack countermeasures may be provided while reducing the circuit scale. Accordingly, both security against the side channel attack and realization of small-sized and rapid encryption processing may be achieved.

Figure 11:
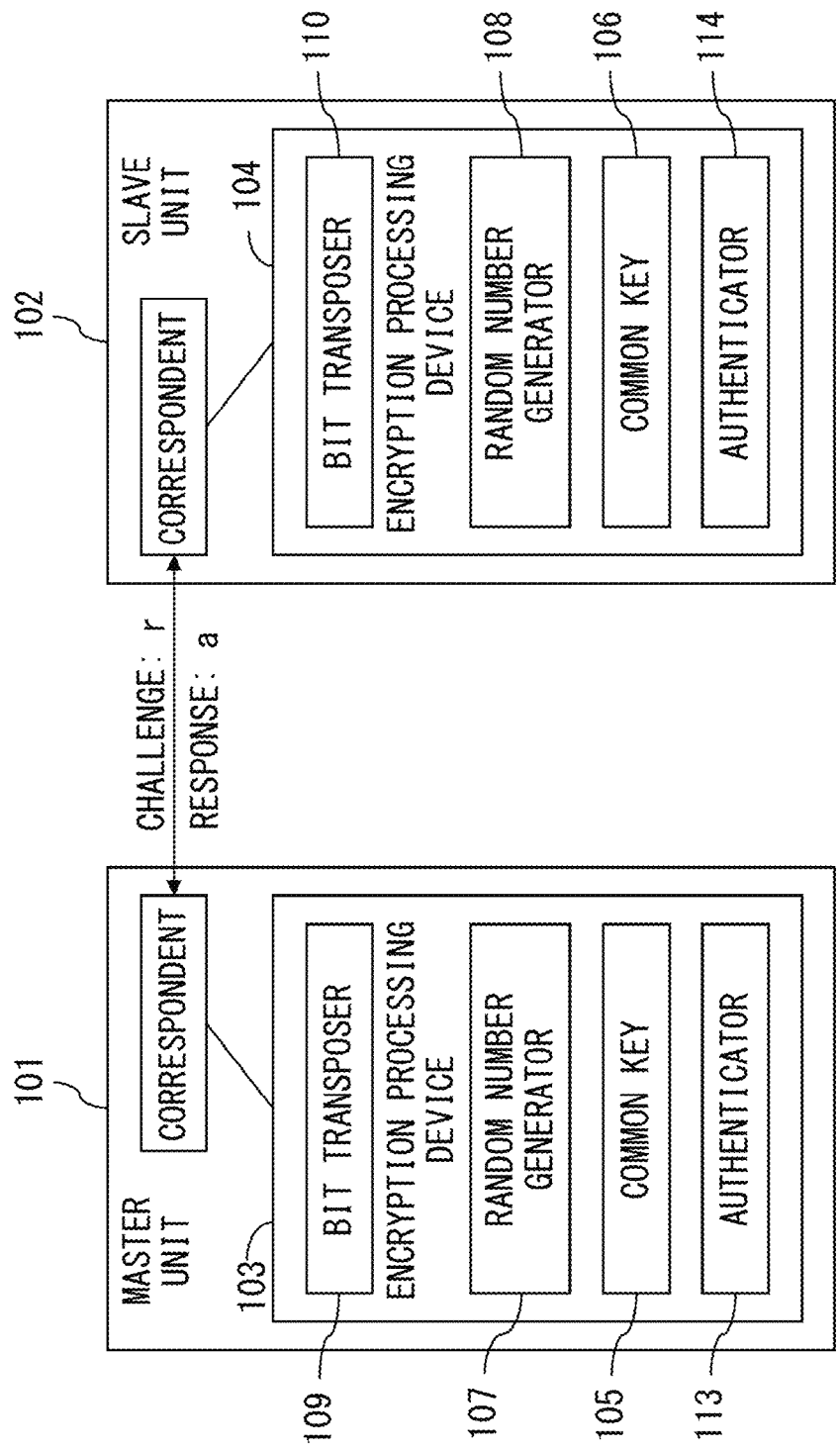
FIG. 11 illustrates a schematic diagram of a system which is applied to each embodiment of the present invention.

FIG. 11 illustrates a schematic diagram of a system which is applied to each embodiment. Similarly to FIG. 1, the system includes a master unit 101 and a slave unit 102. Each of the master unit 101 and the slave unit 102 has devices for processing encryption 103 and 104, communication devices 111 and 112, and comparators 113 and 114. The devices for processing encryption 103 and 104 are electrically connected to the communication devices 111 and 112, respectively. The communication device 111 of the master unit 101 and the communication device 112 of the slave unit 102 are configured so as to communicate with each other through a communication line 113.

The device for processing encryption 103 of the master unit includes a memory 105 configured to store a 128-bit secret key $K_{MAST}$ as a common key, a random number generator 107 configured to generate a random number r which is an integer, and a bit transposer 109 configured to perform a bit transposition to the secret key $K_{MAST}$ using the random number r. Similarly, the slave unit 102 includes a memory 106 configured to store a 128-bit secret key $K_{MAST}$ as a common key, a random number generator 108 configured to generate a random number r which is an integer, and a bit transposer 110 configured to perform a bit transposition to the secret key $K_{MAST}$ using the random number r.

The random number r which is generated in the random number generator 107 is a pseudorandom number. Accordingly, when a type used for generating the random number is decided, the random number to be output is defined deterministically.

A bit transposer 110 is explained in detail together with a method for a bit transposition in the later mentioned examples.

The comparators (authenticators) 113 and 114 authenticate another device for processing encryption by comparing the reply decrypted with a common key with the random number or by comparing the random number encrypted with a common key with the reply.

FIG. 12 illustrates a configuration diagram of an example of a hardware system 200 which may realize a system applied to each embodiment of the present invention. A hardware system may be realized as a general purpose computer or may be realized as a dedicated circuit. In either case, the hardware system 200 has a configuration as a computer and may be applied to both the master unit 101 and the slave unit 102.

In a computer 200 illustrated in FIG. 12, a Central Processing Unit (CPU) 201, a memory 202, an external storage 205, and a communication interface 207 are electrically connected through a bus 208, respectively. As an option, a portable recording medium driving device 206 may be included in which an input device 203, an output device 204, and a portable recording medium 209 are detachably attached. The memory 202 may store a program for controlling the computer 200, a program used for a challenge-and-response authentication protocol executed for authenticating another computer, and a secret key. The program used for a challenge-and-response authentication protocol executed for authenticating another computer includes necessary codes for realizing all or a part and combinations of each embodiment in the specification.

The configuration illustrated in FIG. 12 is one example of hardware for realizing each embodiment of the present invention, and such a hardware system is not limited to this configuration.

The CPU 201 controls an entire computer 200 in response to an instruction included in the programs stored in the memory 202. The memory 202 may include a RAM which stores programs or pieces of data stored in the external storage 205 or the portable recording medium 209 at the time of executing programs and at the time of updating data, and the like. It is preferable that a secret key be stored in a Read Only Memory (ROM). The programs may also be stored in the ROM.

As required, the input device 203 detects input operations by a user with a keyboard, a mouse, and the like, and transmits results to the CPU 201. The output device 204, in response to an instruction from the CPU 201, outputs to a display device, a printing device and the like, data and the like stored in the memory 202 as a result having been obtained by the operation of the CPU 201.

The external storage 205 may be, for example, a hard disk storage device.

In the portable recording medium driving device 206, the portable recording medium 209 such as an optical disk, an SDRAM, a compact flash (registered trademark), and the like is detachably attached and the portable recording medium driving device 206 takes a role similar to the external storage 205.

A communication interface 207 is a device to connect the computer 200 to another computer.

A bus 208 electrically connects the above-mentioned components with each other.

An example of a hardware system 200 which may realize a system applied to each embodiment of the present invention illustrated in FIG. 12 has a hardware configuration which is close to a general purpose computer. However, at least apart of a respective hardware system which may realize a system applied to each embodiment of the present invention may be configured as a dedicated circuit.

In the master unit 101 and the slave unit 102 illustrated in FIG. 11, the devices for processing encryption 103 and 104 include at least a CPU 201, a memory 202, and an external storage 205 of FIG. 12. Communication devices 111 and 112 include a communication interface 207. Comparators (Authenticators) 113 and 114 include at least a CPU 201 and a memory 202 of FIG. 12.

Random number generators 107 and 108 and bit transposers 109 and 110 of the encryption processing devices 103 and 104 include at least a CPU 201 and a memory 202 of FIG. 12.

In the present method, a 128-bit randomized key $K_{ENC}$ is generated by performing a bit transposition on an original 128-bit secret key $K_{MAST}$.

In a side channel attack, the attack cannot be performed unless all the bit values of the partial key of the Sbox to be input are determined. It is impossible to determine the bit values of the partial key, unless all the bit values of the secret key are found, even if the random number is observed outside. In other words, in order to successfully perform the side channel attack, while it is enough to perform a brute-force attack for one partial key, that is, to perform $2^8$ attacks conventionally, by employing the present method, it is, in principle, necessary to perform a brute-force attack for all bits of the secret key, that is, to perform $2^{128}$ attacks.

In the present method, a 128-bit randomized key $K_{ENC}$ is generated by randomly selecting bits from the 128-bit secret key $K_{MAST}$. When noting an 8-bit partial key, since randomly selecting 8 bits from 128 bits is repeated 100 times or more, entropy of the key as an order becomes $128^8 \times 100 = 7.2 \times 10^{18}$ to $2^{64} = 1.8 \times 10^{19}$. This is large enough when compared with the entropy of $2^8$ when there are no countermeasures.

Further, when considering that 100 or more waveforms are necessary in performing aside channel attack, a side channel attack in a realistic time period becomes impossible with the present method in which a secret key is randomized.

As a modification for the above operation, the following operation (called method 2) is also considered.

(Operation 2-1) Dividing the secret key $K_{MAST}$ into n for each predetermined m bit length.
(Operation 2-2) Performing a bit transposition on the secret key divided into n and randomizing each divided secret key to generate n randomized partial keys.
(Operation 2-3) Compressing n randomized partial keys into one by using a compression circuit to prepare a randomized key $K_{ENC}$.
(Operation 2-4) Repeating the above-mentioned (operation 2-1) to (operation 2-3) m times.
(Operation 2-5) Using the randomized key $K_{ENC}$ instead of a secret key $K_{MAST}$ which is used in a conventional authentication protocol.

In operations (2-1) to (2-2), a 128-bit randomized key $K_{ENC}$ is generated by dividing a 128-bit secret key $K_{MAST}$ into an optional bit length and performing a bit transposition randomly on each divided bit string and repeating compressions. As compression functions, a typical XOR circuit, an addition circuit, a subtraction circuit or the like may be used. Further, with regard to a number of repetitions i, when the secret key is divided into 8-bit keys, i=8. The entropy of the 8-bit partial keys in this case becomes $(2^8)^{16} = 2^{128}$ and it corresponds to a brute-force attack for a 128-bit key. Accordingly, it is as safe as the method 1 against the side channel attack.

FIG. 13 illustrates an explanation for processing for generating a randomized key which is applied to each embodiment. Here, although a secret key is set as a 128-bit secret key, it is not necessary to be a 128-bit secret key. A secret key may be a 48-bit secret key, for example.

A 128-bit secret key $K_{MAST}$ stored in the memory 1001 is divided into n divided secret keys $K_{MAST,1}, K_{MAST,2}, \ldots,$ and $K_{MAST,n}$, for each predetermined bit length, for example for each 8 bits.

Each of the n divided secret keys $K_{MAST,1}, K_{MAST,2}, \ldots,$ and $K_{MAST,n}$ is input in the bit transposition circuit 1002 together with random numbers r1, r2, ..., and rn generated in the random number generation circuit 1003 which correspond to the n divided secret keys, respectively. In the bit transposition circuit 1002, a randomized partial key $K_{ENC,j}$ is generated by using one of the n divided keys $K_{MAST,j}$ and a random number rj. As a result, n randomized partial keys $K_{ENC,1}, K_{ENC,2}, \ldots,$ and $K_{ENC,n}$, are generated. The n randomized partial keys $K_{ENC,1}, K_{ENC,2}, \ldots,$ and $K_{ENC,n}$ are input in the compression circuit 1006 and are compressed. Again, the 128-bit key $K_{ENC}$ thus obtained is divided into a predetermined bit length, for example, for each 8 bits, subjected to a bit transposition, and compressed. The operation is repeated 8 times. In the end, a 128-bit randomized key $K_{ENC}$ is generated. The randomized key $K_{ENC}$ thus generated is used instead of a secret key $K_{MAST}$ which is used in a conventional authentication protocol.

Similarly to the above-mentioned method 1, the present method 2 may be executed by a system and a hardware system illustrated in FIG. 11 and FIG. 12.

Explanations are given for processing of a challenge-and-response authentication protocol in accordance with first to sixth embodiments of the present invention in reference to FIG. 14 to FIG. 19. In FIG. 14 to FIG. 19, the master unit 101 and the slave unit 102 share the secret key $K_{MAST}$ beforehand.

First Embodiment

Explanations are given for a first embodiment of the present invention, in reference to FIG. 14. In the present embodiment, a challenge-and-response authentication method (protocol) which uses a unilateral authentication and uses both encryption and decryption is disclosed.

In step S501, the master unit 101 which is the authentication side generates a random number r and transmits it to the slave unit 102 which is the authenticated side. In step S502, first, the slave unit 102 receives the random number r from the master unit 101. Further, the slave unit 102 generates a randomized key $K_{ENC}$=RAND ($K_{MAST}$, r) by using a secret key $K_{MAST}$ which is stored in the slave unit 102 and the random number r which is received from the master unit 101. Here, c=RAND (a, b) indicates that a randomized key c is obtained by performing randomizing processing on a key a by using a random number b. Further, in step S503, the slave unit 102 executes encryption processing Enc (r, $K_{ENC}$) to the random number r received from the master unit 101 by using a randomized key $K_{ENC}$, and returns to the master unit 101 a value obtained by encryption processing as a reply a=Enc (r, $K_{ENC}$). However, Q=Enc (P, K) indicates that a result of a plain text P encrypted by the key K using the common key K is an encryption text Q. In step S504, the master unit 101 which received the reply a generates a randomized key $K_{ENC}$=RAND ($K_{MAST}$, r) by using a secret key $K_{MAST}$ which is stored in the master unit 101 and the random number r which is generated in step S501. The key is the same as the randomized key generated by the slave unit 102 in step S502. Decryption processing Dec (a, K) is executed by using the randomized key $K_{ENC}$ and a value obtained by the decryption processing is set as a decryption result r'=Dec (a, $K_{ENC}$). Then a decryption result r' and the random number r generated in step S301 are compared. When the decryption result r' and the random number r are matched, the master unit 101 recognizes that the slave unit 102 is a piece of authentic equipment.

Thus, a first embodiment of the present invention differs from the challenge-and-response authentication method illustrated in FIG. 2, in that the former includes steps S502 and S504 in which a randomized key $K_{ENC}$ is generated from a random number r generated in the master unit and a secret key $K_{MAST}$. Randomization processing of a secret key is indicated as $K_{ENC}$=RAND ($K_{MAST}$, r), and various schemes exist. Some of the specific examples of randomization processing are explained in detail as examples.

Second Embodiment

Figure 15:
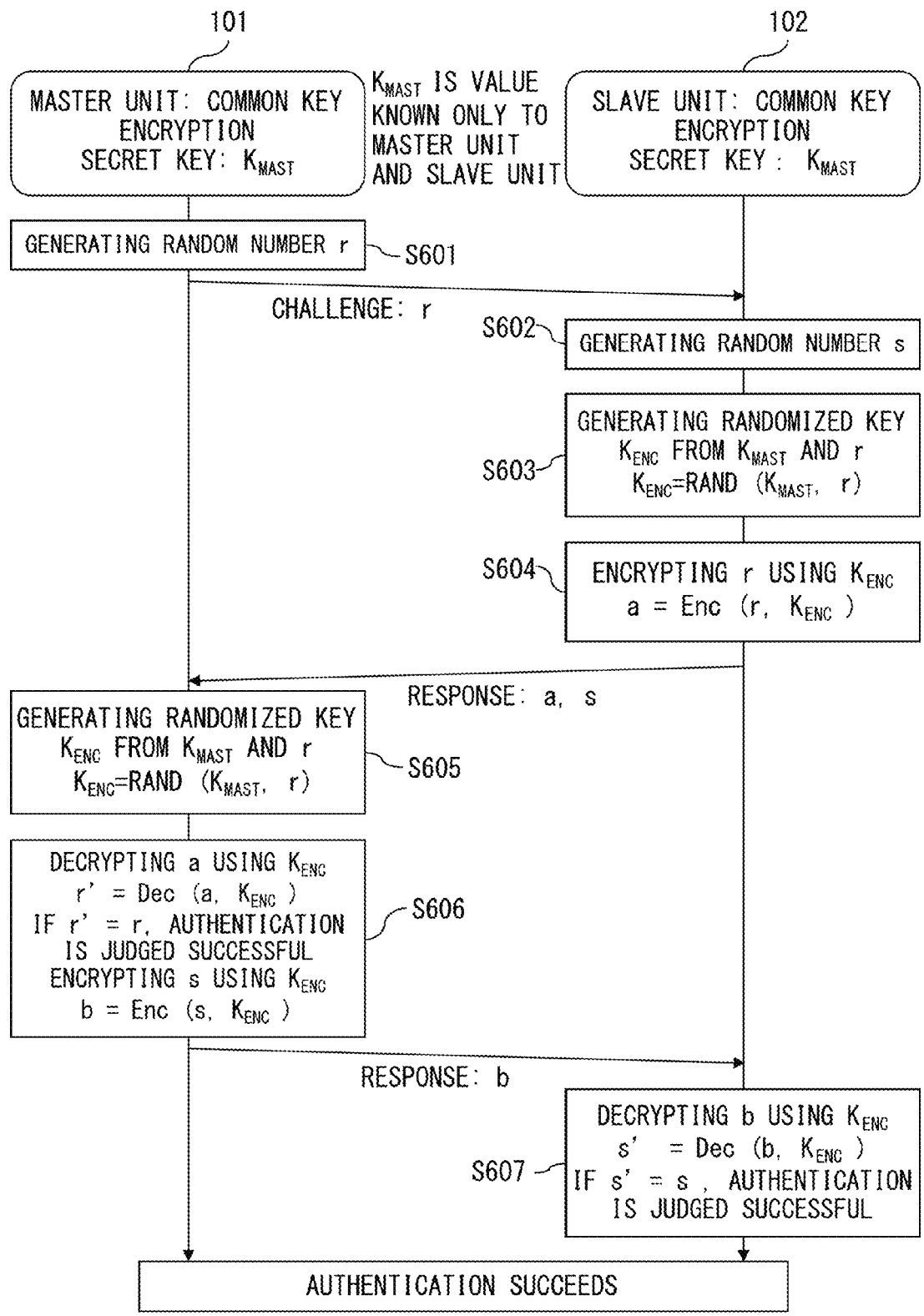
FIG. 15 illustrates processing of a challenge-and-response authentication protocol (bilateral authentication, encryption/decryption) according to a second embodiment of the present invention.

In reference to FIG. 15, explanations are given for a second embodiment of the present invention. In the present embodiment, a challenge-and-response authentication method (protocol) which uses a bilateral authentication and uses both encryption and decryption is disclosed.

Even though in the above authentication method, generation of a randomized key $K_{ENC}$ and a challenge-and-response authentication are performed using the random number generated by the master unit 101, when the attack of fixing the random number generated by the master unit 101 is executed, the randomized key $K_{ENC}$ becomes a fixed value as well, and there is a concern that a side-channel attack countermeasure would be invalidated. The attack of fixing the random number may be avoided by generating the random number at the side of the slave unit 102 as well and by using the value thus generated combined with the random value generated at the side of the master unit 101 to perform randomization and a challenge-and-response authentication.

In step S601, similarly to step S501 of FIG. 14, the master unit 101 generates the random number r and transmits it to the slave unit 102. In step S602, first, the slave unit 102 receives the random number r from the master unit 101. In step S603, the slave unit 102 generates a random number s. Further, in step S604, the slave unit 102 generates a randomized key $K_{ENC}$=RAND ($K_{MAST}$,r) using a secret key $K_{MAST}$ stored in the slave unit 102 and the random number r received from the master unit 101. Further, in step S603, the slave unit 102 executes encryption processing Enc (r, $K_{ENC}$) to the random number r received from the master unit 101, generates a reply a=Enc (r, $K_{ENC}$), and returns to the master unit 101 together with the random number s. In step S605, the master unit 101 which received the reply a from the slave unit 102 generates a randomized key $K_{ENC}$=RAND ($K_{MAST}$, r) by using a secret key $K_{MAST}$ which is stored in the master unit 101 and a random number r generated in step S601. In step S606, decryption processing Dec (a, $K_{ENC}$) is executed using the randomized key $K_{ENC}$ and a value obtained by the decryption processing is set as a decryption result r'=Dec (a, $K_{ENC}$). Then a decryption result r' and the random number r generated in step S601 are compared. When the decryption result r' and the random number r are matched, the master unit 101 recognizes that the slave unit 102 is a piece of authentic equipment. When the master unit 101 recognizes that the slave unit 102 is a piece of authentic equipment, subsequently, the master unit 101 executes encryption processing of s Enc (s, $K_{ENC}$) by using the randomized key $K_{ENC}$ and transmits it to the slave unit 102 as a reply b=Enc (s, $K_{ENC}$). In step S607, a slave unit 102 which received a reply b from the master unit 101 executes decryption processing Dec (b, $K_{ENC}$) by using the randomized key $K_{ENC}$ and sets a value obtained by decryption processing as decryption result s'=Dec (b, $K_{ENC}$). Then, a decryption result s' and the random number s generated in step S602 are compared. When the decryption result s' and the random number s are matched, the slave unit 102 recognizes that the master unit 101 is a piece of authentic equipment.

Third Embodiment

Figure 16:
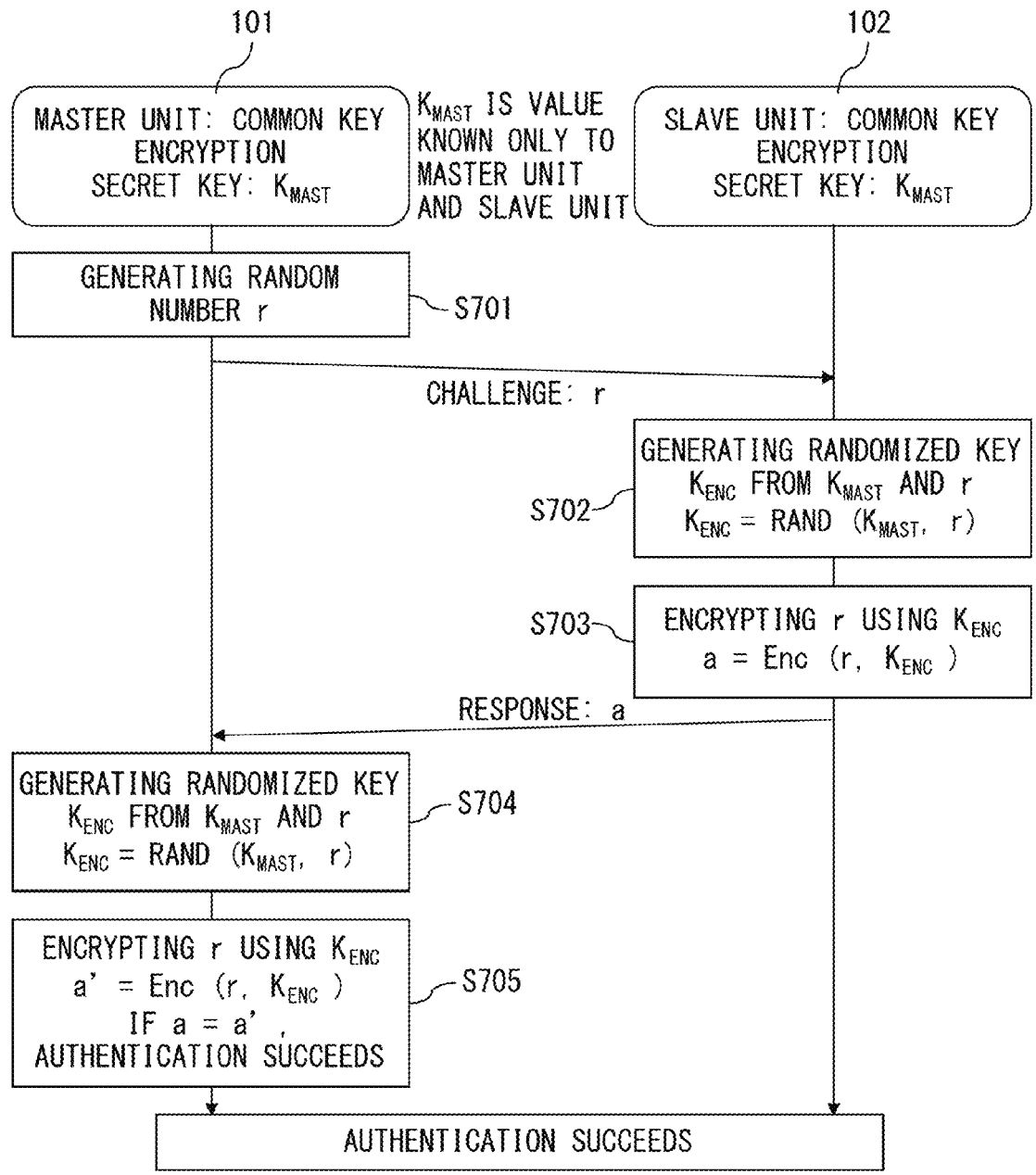
FIG. 16 illustrates processing of a challenge-and-response authentication protocol (bilateral authentication, encryption only) according to a third embodiment of the present invention.

In reference to FIG. 16, explanations are given for a third embodiment of the present invention. In the present embodiment, a challenge-and-response authentication method (protocol) which uses a unilateral authentication and which uses only decryption processing is disclosed.

In step S701, similarly to step S501, the master unit 101 which is the authentication side generates the random number r and transmits it to the slave unit 102. In step S702, first, the slave unit 102 receives the random number r from the master unit 101. Further, the slave unit 102 generates a randomized key $K_{ENC}$=RAND ($K_{MAST}$, r) using a secret key $K_{MAST}$ stored in the slave unit 102 and the random number r received from the master unit 101. Further, in step S703, the slave unit 102 executes encryption processing Enc (r, $K_{ENC}$) on the random number r received from the master unit 101 and returns to the master unit 101 a value obtained by the encryption processing as a reply a=Enc (r, $K_{ENC}$). In step S704, the master unit 101 which received the reply a generates a randomized key $K_{ENC}$=RAND ($K_{MAST}$, r) by using a secret key $K_{MAST}$ which is stored in the master unit 101 and a random number r generated in step S701. In step S705, encryption processing Enc (r, $K_{ENC}$) is executed using the randomized key $K_{ENC}$ and a result thereof is set as r'=Enc (r, $K_{ENC}$). Then an encryption result r' and the random number r generated in step S701 are compared. When the encryption result r' and the random number r are matched, the master unit 101 recognizes that the slave unit 102 is a piece of authentic equipment.

Fourth Embodiment

In reference to FIG. 17, explanations are given for a fourth embodiment of the present invention. In the present embodiment, a challenge-and-response authentication method (protocol) which uses a bilateral authentication and which uses only decryption processing is disclosed.

In step S801, the master unit 101 generates the random number r and transmits it to the slave unit 102. In step S802, first, the slave unit 102 receives the random number r from the master unit 101. In step S803, the slave unit 102 generates a random number s. Further, in step S804, a slave unit 102 generates a randomized key $K_{ENC}$=RAND ($K_{MAST}$,r) using a secret key $K_{MAST}$ stored in the slave unit 102 and the random number r received from the master unit 101. Further, in step S803, the slave unit 102 executes encryption processing Enc (r, $K_{ENC}$) on the random number r received from the master unit 101 using the randomized key $K_{ENC}$, generates a reply a=Enc (r, $K_{ENC}$), and returns it to the master unit 101 together with a random number s. In step S805, the master unit 101 which received the reply a from the slave unit 102 generates a randomized key $K_{ENC}$=RAND ($K_{MAST}$, r) by using a secret key $K_{MAST}$ which is stored in the master unit 101 and a random number r generated in step S601. In step S806, encryption processing of r Enc (r, $K_{ENC}$) is executed using the randomized key $K_{ENC}$ and a result thereof is set as r'=Enc (r, $K_{ENC}$). Then an encryption result r' and the random number r generated in step S801 are compared. When the encryption processing result r' and the random number r are matched, the slave unit 102 recognizes that the master unit 101 is a piece of authentic equipment. When the master unit 101 recognizes that the slave unit 102 is a piece of authentic equipment, subsequently, the master unit 101 executes encryption processing of s Enc (s, $K_{ENC}$) by using the randomized key $K_{ENC}$ and transmits it to the slave unit 102 as a reply b=Enc (s, $K_{ENC}$). In step S807, a slave unit 102 which received a reply b from the master unit 101 generates a randomized key $K_{ENC}$=RAND ($K_{MAST}$, s) using a secret key $K_{MAST}$ stored in the slave unit 102 and a random number s generated in step S802. Further, in step S807, encryption processing of s Enc (s, $K_{ENC}$) is executed by using the randomized key $K_{ENC}$ and a result thereof is set as s'=Enc (s, $K_{ENC}$). Then, an encryption result s' and the random number s generated in step S801 are compared. When the encryption result s' and the random number s are matched, the master unit 101 recognizes that the slave unit 102 is a piece of authentic equipment.

Fifth Embodiment

Figure 18:
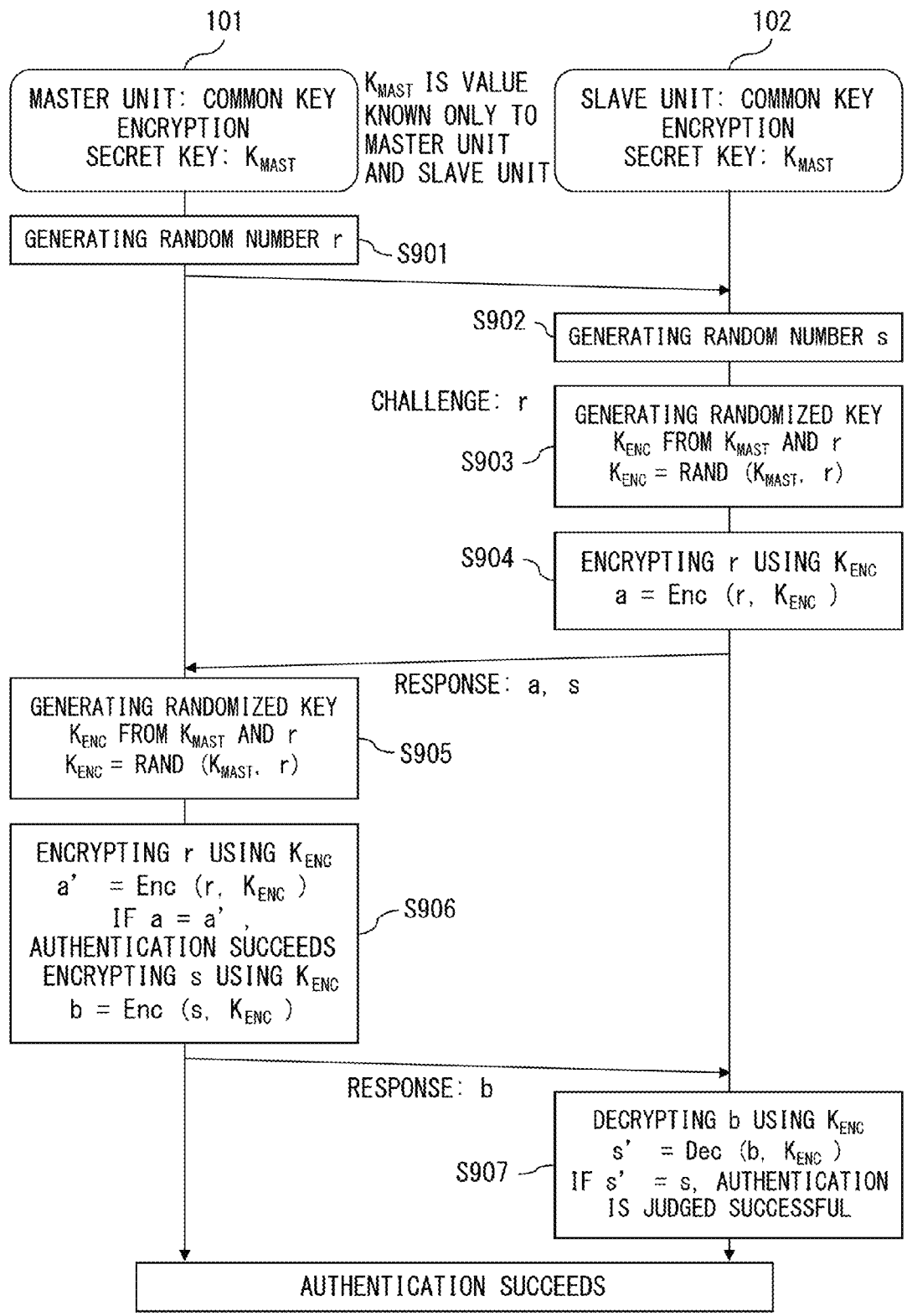
FIG. 18 illustrates processing of a challenge-and-response authentication protocol (bilateral authentication, encryption only for a master unit, encryption/decryption for a slave unit) according to a fifth embodiment of the present invention.

In reference to FIG. 18, explanations are given for a fifth embodiment of the present invention. In the present embodiment, a challenge-and-response authentication method (protocol) is disclosed which uses a bilateral authentication, and which uses encryption and decryption processing when the slave unit authenticates the master unit, and which uses decryption only when the master unit authenticates the slave unit.

In step S901, the master unit 101 generates the random number r and transmits it to the slave unit 102. In step S902, first, the slave unit 102 receives the random number r from the master unit 101. In step S903, the slave unit 102 generates a random number s. Further, in step S904, a slave unit 102 generates a randomized key $K_{ENC}$=RAND ($K_{MAST}$,r) using a secret key $K_{MAST}$ stored in the slave unit 102 and the random number r received from the master unit 101. Further, in step S903, the slave unit 102 executes encryption processing Enc (r, $K_{ENC}$) on the random number r received from the master unit 101 using the randomized key $K_{ENC}$, generates a reply a=Enc (r, $K_{ENC}$), and returns it to the master unit 101 together with a random number s. In step S905, the master unit 101 which received the reply a from the slave unit 102 generates a randomized key $K_{ENC}$=RAND ($K_{MAST}$, r) by using a secret key $K_{MAST}$ which is stored in the master unit 101 and a random number r generated in step S901. In step S906, encryption processing of r Enc (r, $K_{ENC}$) is executed using the randomized key $K_{ENC}$ and a result thereof is set as r'=Enc (r, $K_{ENC}$). Then, an encryption result r' and the random number r generated in step S801 are compared. When the encryption processing result r' and the random number r are matched, the slave unit 102 recognizes that the master unit 101 is a piece of authentic equipment. When the master unit 101 recognizes that the slave unit 102 is a piece of authentic equipment, subsequently, the master unit 101 executes encryption processing of s Enc (s, $K_{ENC}$) by using the randomized key $K_{ENC}$ and transmits it to the slave unit 102 as a reply b=Enc (s, $K_{ENC}$). In step S 907, a slave unit 102 which received a reply b from the master unit 101 executes decryption processing Dec (b, $K_{ENC}$) using the randomized key $K_{ENC}$ and sets a value obtained by the decryption processing as a decryption result s'=Dec (b, $K_{ENC}$). Then a decryption result s' and the random number s generated in step S602 are compared. When the decryption result s' and the random number s are matched, the slave unit 102 recognizes that the master unit 101 is a piece of authentic equipment.

Sixth Embodiment

Figure 19:
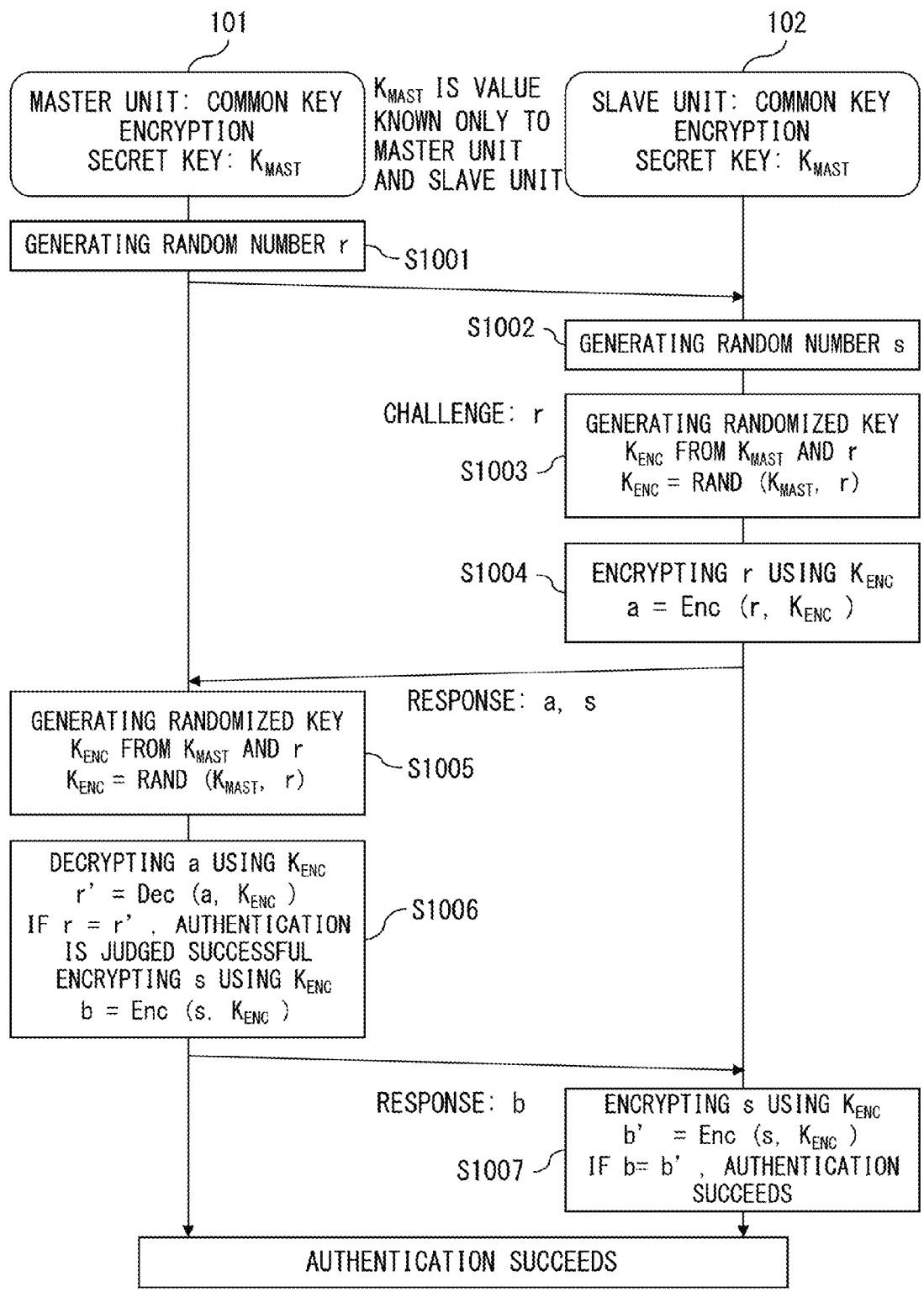
FIG. 19 illustrates processing of a challenge-and-response authentication protocol (bilateral authentication, encryption/decryption for a mater unit, encryption only for a slave unit) according to a sixth embodiment of the present invention.

In reference to FIG. 19, explanations are given for a sixth embodiment of the present invention. In the present embodiment, a challenge-and-response authentication method (protocol) is disclosed which uses a bilateral authentication, and which uses encryption and decryption processing when the master unit authenticates the slave unit, and which uses decryption only when the slave unit authenticates the master unit.

In step S1001, the master unit 101 generates the random number r and transmits it to the slave unit 102. In step S1002, first, the slave unit 102 receives the random number r from the master unit 101. In step S1003, the slave unit 102 generates a random number s. Further, in step S1004, a slave unit 102 generates a randomized key $K_{ENC}$=RAND ($K_{MAST}$,r) using a secret key $K_{MAST}$ stored in the slave unit 102 and the random number r received from the master unit 101. Further, in step S1003, the slave unit 102 executes encryption processing Enc (r, $K_{ENC}$) on the random number r received from the master unit 101 using the randomized key $K_{ENC}$, and generates a reply a=Enc (r, $K_{ENC}$) and returns it to the master unit 101 together with a random number s. In step S1005, the master unit 101 which received the reply a from the slave unit 102 generates a randomized key $K_{ENC}$=RAND ($K_{MAST}$, r) by using a secret key $K_{MAST}$ which is stored in the master unit 101 and a random number r generated in step S1001. In step S1006, decryption processing Dec (r, $K_{ENC}$) is executed using the randomized key $K_{ENC}$ and a result obtained by the decryption processing is set as r'=Dec (a, $K_{ENC}$). Then a decryption result r' and the random number r generated in step S 1001 are compared. When the decryption processing result r' and the random number r are matched, the master unit 101 recognizes that the slave unit 102 is a piece of authentic equipment. When the master unit 101 recognizes that the slave unit 102 is a piece of authentic equipment, subsequently, the master unit 101 executes encryption processing of s Enc (s, $K_{ENC}$) by using the randomized key $K_{ENC}$ and transmits it to the slave unit 102 as a reply b=Enc (s, $K_{ENC}$). In step S1007, a slave unit 102 which received a reply b from the master unit 101 generates a randomized key $K_{ENC}$=RAND ($K_{MAST}$, s) using a secret key $K_{MAST}$ stored in the slave unit 102 and the random number s generated in step S1002. Further, in step S1007, encryption processing Enc (s, $K_{ENC}$) is executed using the randomized key $K_{ENC}$ and a result thereof is set as s'=Enc (s, $K_{ENC}$). Then an encryption result s' and the random number s generated in step S1001 are compared. When the encryption result s' and the random number s are matched, the master unit 101 recognizes that the slave unit 102 is a piece of authentic equipment.

Method for Generating Randomized Key

In the above-mentioned first to sixth embodiments, explanations are given for some examples with regard to a method of generating a randomized key $K_{ENC}$ from a secret key $K_{MAST}$. In addition, an estimate of the circuit scale is also disclosed for each example.

The method for generating a randomized key has a restriction in that the scale of a circuit for realizing the method be not large, in order to provide side-channel attack countermeasures while suppressing increases in cost. In both methods 1 and 2, a bit transposition is performed, and as circuits for performing the bit transposition, the following circuits are considered.
(Bit transposition circuit 1) a selector circuit
(Bit transposition circuit 2) a linear feedback shift register (LFSR) circuit
(Bit transposition circuit 3) a connecting circuit
(Bit transposition circuit 4) a combinations of at least two of the above (1) to (3)

In (operation 2-3), compression circuits are used. As compression circuits, the following circuits are considered.
(Compression circuit 1) a selector circuit
(Compression circuit 2) an XOR circuit
(Compression circuit 3) an addition or subtraction circuit By using any one of the above bit transposition circuits, hardware which may execute the above method 1 may be configured. By using any one of the above bit transposition circuits and any one of the above compression circuits, hardware which may execute the above method 2 may be configured.

First Example of Method for Generating Randomized Key

FIG. 20 illustrates a first example in processing for generating a randomized key. It is presupposed that in all examples a 128-bit key is used in a 128-bit common key block encryption. In other words, a secret key $K_{MAST}$ is a 128-bit key and a random number r has 128 bits at most.

The 128-bit secret key $K_{MAST}$ is input in a 128-bit input selector circuit and selects any one bit from 128 bits by externally inputting a select signal generated by the random number generation circuit and in which the value is determined by a 7-bit random number. By executing 128 cycles of processing, a randomized 128-bit randomized key $K_{ENC}$ is generated.

FIG. 21 illustrates a table of an estimation standard for the circuit scale. Here, a circuit scale which is converted into the number of two input NAND (NOR) gates is indicated. In the table of FIG. 21, an estimation of the circuit scale per bit is illustrated. For example, it is estimated as 11×8=88 gates for an 8-bit register, and is estimated as 13.5×16=216 gates for a 16-bit shift register. Further, in the table of FIG. 19, even though a scale of a 2-input 1-output (indicated as 2-1) operation circuit is illustrated, a scale of an m-input 1-output (indicated as m−1) circuit is (m−1) times as large as that of a 2-input 1-output operation circuit. For example, a 10-bit 2-1 XOR circuit has 3.5×10=35 gates, while a 10-bit 4-1 XOR circuit has 105 gates, the circuit scale being three times as large as that of a 10-bit 2-1 XOR circuit. In the case of a 20-bit 4-14 addition circuit, it has (20×15)×3=900 gates. An estimation of an expansion of a countermeasure circuit scale is evaluated by removing a circuit (a 128-bit key register and a random number generation circuit) which is commonly shared with the case of no encryption circuit and no countermeasures, and hereafter, the expansion in the circuit scale along with the countermeasures is indicated as a circuit scale.

Figure 23:
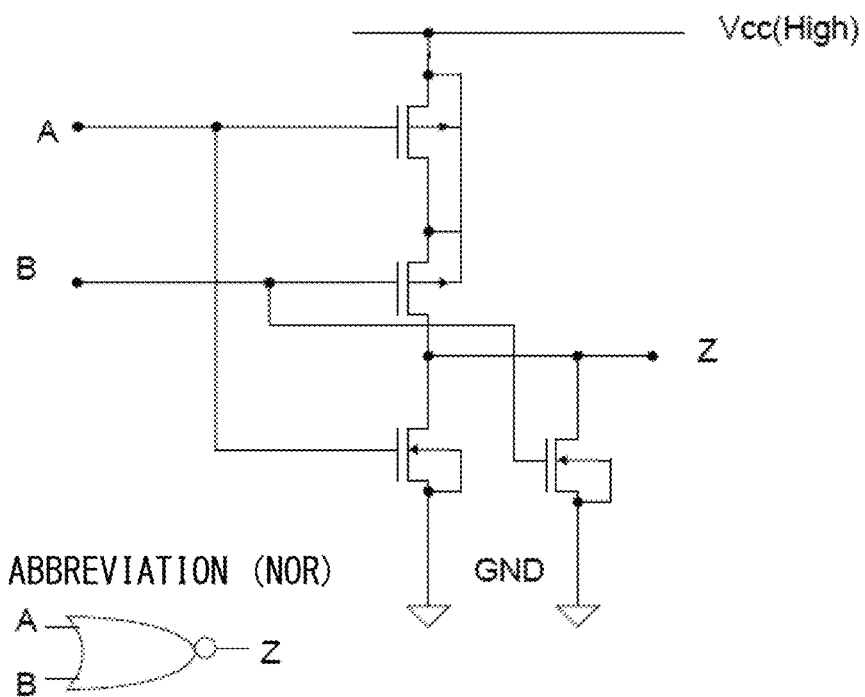
FIG. 23 illustrates an example of a circuit of a 2-1 NOR gate.

FIG. 22 illustrates an example of a circuit of a NAND gate which is an evaluation standard of a circuit scale. FIG. 23 illustrates an example of a circuit of a NOR gate. As illustrated in FIG. 22 and FIG. 23, for both a 2-input NAND gate and a 2-input NOR gate, one gate is configured by four field effect transistors (FETs), such as metal oxide semiconductor field effect transistors (MOSFETs).

FIG. 24 illustrates an example of a circuit of a NOT gate. A NOT gate is configured of two FETs. Accordingly, the circuit scale of the NOT gate is a 0.5 gate, as illustrated in the table of FIG. 19.

Figure 25:
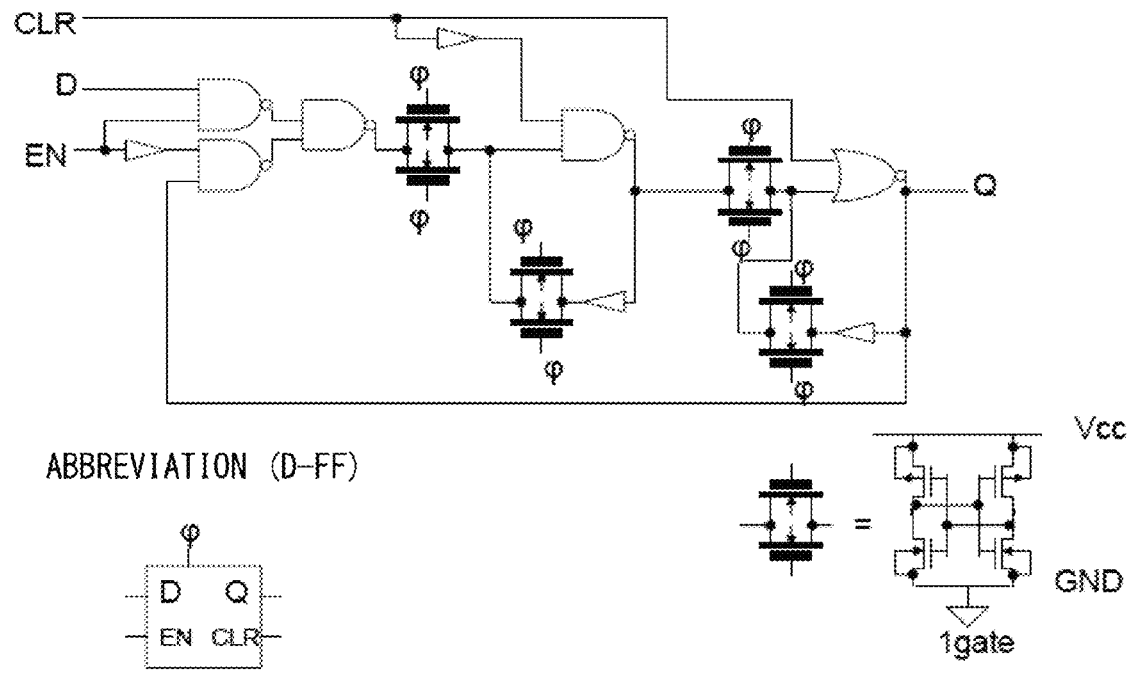
FIG. 25 illustrates an example of a circuit of a register.

FIG. 25 illustrates an example of a circuit of a register which is configured by a 1-input D flip-flop. A register is configured of four NAND gates, one NOR gate, four NOT gates, and four gate units each of which consists of one gate, as illustrated in FIG. 23. Accordingly, the number of gates of the register is eleven.

FIG. 26 illustrates an example of a circuit of a 2-input 1-output (2-1) XOR (exclusive OR) gate. A 2-1 XOR gate circuit is configured of two NOR gates and one NAND gate. Accordingly, scale of the 2-1 XOR gate circuit is 3.5 gates.

FIG. 27A and FIG. 27B respectively illustrate an example of a circuit of a 2-1 selector. FIG. 27A illustrates a multiplexer and FIG. 27B illustrates a demultiplexer. As illustrated in FIG. 27A, a 2-1 multiplexer is configured of three NAND gates and one NOT gate. Accordingly, the scale of the 2-1 multiplexer is 3.5 gates. As illustrated in FIG. 27B, a demultiplexer is configured of two NAND gates and three NOT gates, and accordingly, the scale of the demultiplexer is 3.5 gates.

FIG. 28 illustrates an example of a circuit of a shift/cyclic register. In FIG. 28, a three-stage shift/cyclic register is illustrated. A one-stage shift/cyclic register is configured of one selector (MUX) and one register. Accordingly, the scale of the shift/cyclic register is 14.5 gates.

Figure 29:
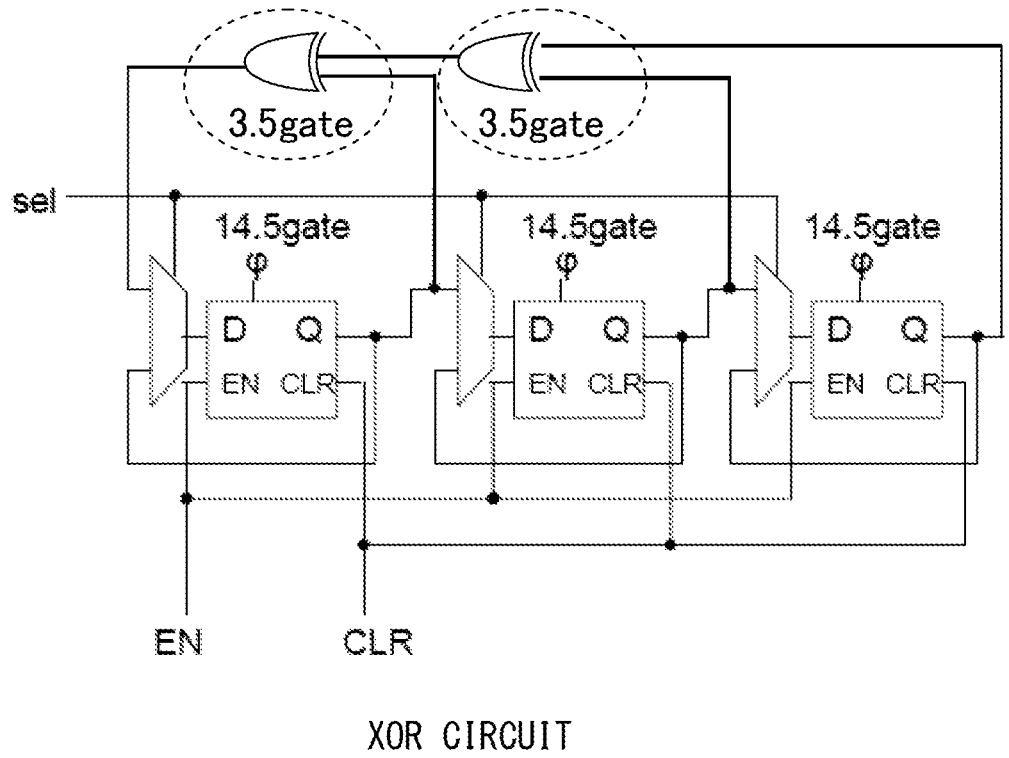
FIG. 29 illustrates an example of an LFSR/residue arithmetic circuit.

FIG. 29 illustrates an example of a linear feedback shift register (LFSR)/residue arithmetic circuit. In FIG. 29, a three-stage LFSR/residue arithmetic circuit is illustrated. As illustrated in FIG. 29, a one-stage LFSR/residue arithmetic circuit is configured of one selector (MUX), one register, and zero or one XOR gate in accordance with the number of bits. Accordingly, the scale of the LFSR/residue arithmetic circuit is 18 gates at most.

An estimation of the circuit scale of the present example is as follows. The circuit of the present example is configured of one 128-bit key register for storing a randomized key, one 128-input 1-output (128-1) selector circuit, and one 128-input 1-output (128-1) multiplexer. Accordingly, the scale of the circuit of the present example is 2.3 k gates. The results are put together in FIG. 30. An estimation of an expansion of the scale of a countermeasure circuit is evaluated by removing a circuit (a 128-bit key register and a random number generation circuit) which is commonly shared with the case of no encryption circuit and no countermeasures, and hereafter, the expansion of the scale of the circuit along with the countermeasures is indicated as a circuit scale.

Thus, in the present example, a circuit for implementing a method for generating the above-mentioned randomized key having a small scale has been provided. By applying the method of generating the randomized key using a circuit of the present example to any one of the above-mentioned embodiments 1 to 6, a device for processing encryption which realizes both security against side channel attacks and small-scaled and rapid encryption processing may be obtained.

Second Example of Method for Generating Randomized Key

Explanations are given for a second example of a method for generating a randomized key $K_{ENC}$ from a secret key $K_{MAST}$, in reference to FIG. 31.

FIG. 31 illustrates a second example of processing for generating a randomized key.

A 128-bit secret key $K_{MAST}$ and a random number r generated by a random number generation circuit are input in a 128-input LFSR circuit, and bit shifts are repeated r times to generate a randomized key $K_{ENC}$. A maximum value of the random number r may be not greater than a maximum cycle ($2^{128}-1$) of the LFSR circuit.

An estimation of the scale of the circuit of the present example is as follows. The circuit of the present example is configured of one 128-bit key register and one 128-bit LSFR circuit. Accordingly, when referring to the table of FIG. 21, its scale is 3.7 k bits.

Third Example of Method for Generating Randomized Key

FIG. 32 illustrates a third example of processing for generating a randomized key.

Values $k_{MAST,1}, k_{MAST,2}, \ldots,$ and $k_{MAST,127}$ for each bit of a 128-bit secret key $K_{MAST}$ are input in a bit of a connection destination of a connecting circuit, and the values of a secret key are rearranged as $k'_{MAST,1}, k'_{MAST,2}, \ldots,$ and $k'_{MAST,127}$, beginning from the most significant bit. Such a rearrangement is repeated by a number of times equal to the number of random numbers r generated by a random number generation circuit and the randomized key $K_{ENC}$ is generated. Although the number of repetitions may be set in accordance with resources, a sufficiently large number is required.

In the present example, since a connecting circuit consists only of lines, it need not be included in the circuit scale, and the scale of only the 128-bit randomized key register of the connecting circuit is 1.4 k.

Fourth Example of Method for Generating Randomized Key

FIG. 33 illustrates a fourth example of processing for generating a randomized key.

In the present example, first, values $k_{MAST,1}, k_{MAST,2}, \ldots,$ and $k_{MAST,127}$ for each bit of a 128-bit secret key $K_{MAST}$ are input in a selector circuit of a connection destination of connecting circuits 1 and 2, and in the selector circuit, a one-bit random number generated by the random number generation circuit is input as a selector signal, and selects either one of the inputs through a connecting circuit 1 or 2 to be set as $k'_{MAST,n}$. Thus, values of the secret key are rearranged as $k'_{MAST,1}, k'_{MAST,2}, \ldots,$ and $k'_{MAST,127}$, beginning from the most significant bit. Such a rearrangement is repeated a number of times equal to the number of random numbers r generated by a random number generation circuit and the randomized key $K_{ENC}$ is generated. The number of patterns of connecting circuits may be set as two or more, and the number of repetitions may be set in accordance with resources.

An estimation of the scale of the circuit scale of the present example is as follows. The circuit of the present example is configured of one 128-bit key register and one 128-bit 2-1 selector circuit. Accordingly, when referring to the table of FIG. 21, its scale is 1.8 k bits.

Fifth Example of Method for Generating Randomized Key

Figure 34:
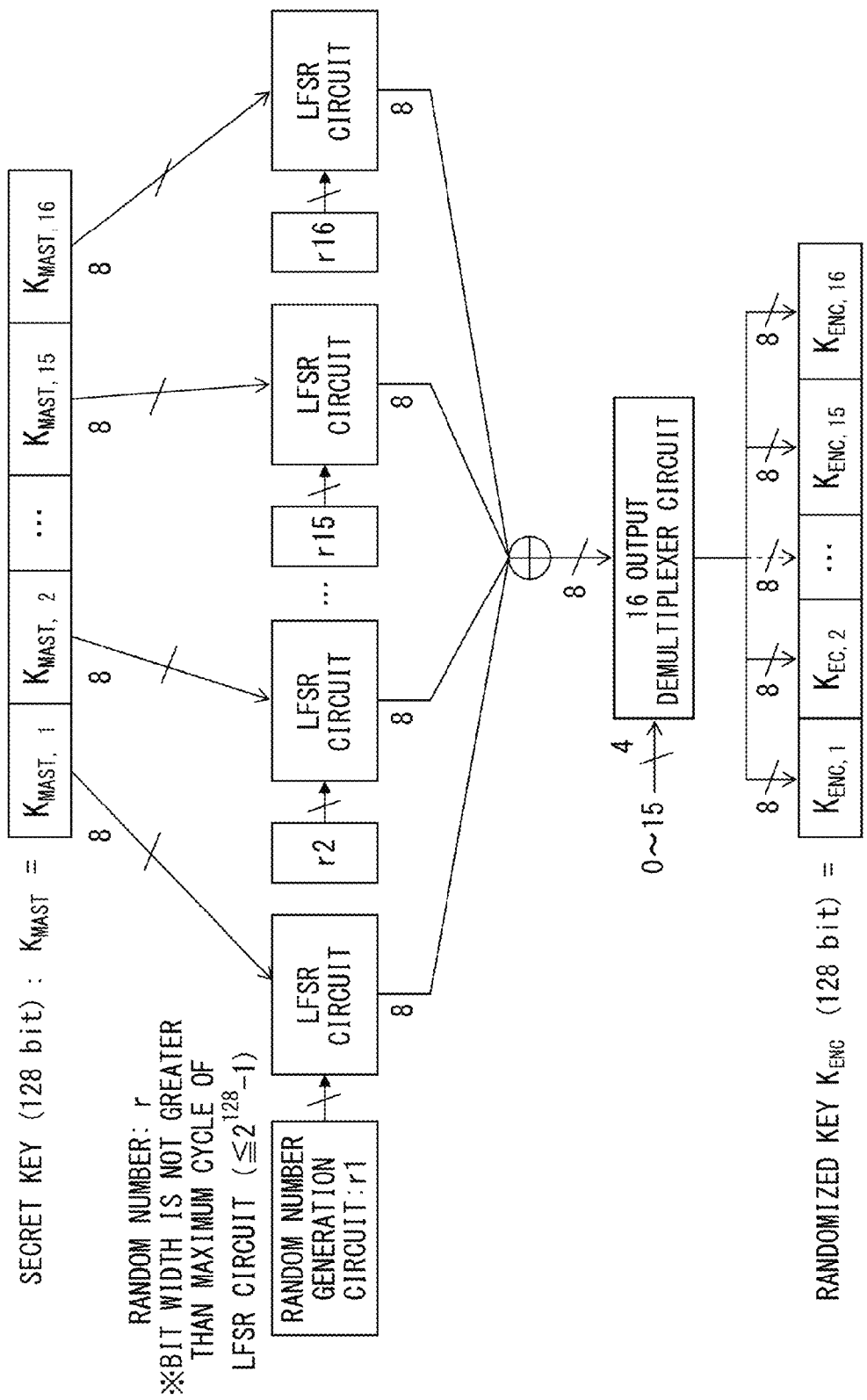
FIG. 34 illustrates a fifth example of processing for generating a randomized key.

FIG. 34 illustrates a fifth example of processing for generating a randomized key.

In the present example, first, a 128-bit secret key $K_{MAST}$ is divided into 16 parts of 8 bits each. Each of the secret keys $K_{MAST}$ divided into 16 parts and a random number generated by the random number generation circuit are input in an 8-bit LFSR circuit and feedback shifts are performed r times. Sixteen 8-bit partial keys are input in an XOR circuit to prepare a randomized 8-bit partial key. This processing is repeated 16 times to generate a 128-bit randomized key $K_{ENC}$.

An estimation of the scale of the circuit of the present example is as follows. The circuit of the present example is configured of two 128-bit key register, sixteen 8-bit LFSR circuits, one 8-bit 16-input XOR circuit, and two 8-bit 16-1 multiplexer circuits. Accordingly, when referring to the table of FIG. 21, its scale is 4.5 k bits.

Sixth Example of Method for Generating Randomized Key

FIG. 35 illustrates a sixth example of processing for generating a randomized key.

In the present example, first, a 128-bit secret key $K_{MAST}$ is divided into 16 parts of 8 bits each. An $i^{th}$ partial key of the secret key $K_{MAST}$ divided into 16 parts and a 4-bit random number $r_1$ generated by the random number generation circuit are input in a selector circuit and one of the sixteen partial keys is selected. Subsequently, one selected 8-bit key and a 4-bit random number $r_2$ generated by the random number generation circuit are input in an LFSR circuit, and feedback shifts are performed $r_2$ times. The result is stored in a data register as $k'_{MAST,i}$. This processing is repeated 16 times from i=1 to i=16 to obtain sixteen $k'_{MAST,i}$ (i=1 to 16). Subsequently, sixteen $k'_{MAST,i}$ are input in an XOR circuit to prepare a randomized 8-bit partial key. This processing is repeated 16 times to generate a 128-bit randomized key $K_{ENC}$.

An estimation of the scale of a circuit of the present example is as follows. The circuit of the present example is configured of two 128-bit key registers, one 8-bit 16-input 1-output (16-1) selector circuit, one 8-bit LFSR circuit, one 8-bit 16-input 1-output XOR circuit, and two 8-bit 16-1 demultiplexers. Accordingly, when referring to the table of FIG. 21, its scale is 4.6 k bits.

Seventh Example of Method for Generating Randomized Key

FIG. 36A and FIG. 36B illustrate a seventh example of processing for generating a randomized key.

In the present example, first, a 128-bit secret key $K_{MAST}$ is divided into 16 parts of 8 bits each. An $i^{th}$ partial key of the secret key $K_{MAST}$ divided into 16 parts is input in a bit transposition circuit (i), which is an $i^{th}$ bit transposition circuit.

FIG. 36B illustrates a bit transposition circuit (i).

An $i^{th}$ 8-bit partial key $K_{MAST,i}$ of a secret key $K_{MAST}$ and a random number $r_1$ which is an integer from 0 to 2 generated by a random number generation circuit are input in a 3-input 1-output selector. The remaining two inputs are the previous output k'$_{MAST,i}$ from the selector and the output obtained as a result of further inputting the k'$_{MAST,i}$ in the connecting circuit. The selection by the selector is repeated a random number r$_2$ times, the random number r$_2$ being generated by a random number generation circuit, to obtain an output k"$_{MAST,i}$.

The outputs of bit transposition circuits (1) to (16), k"$_{MAST,1}$ to k"$_{MAST,16}$, are input in an XOR circuit and are compressed to obtain an 8-bit random key k$_{ENC,i}$. By repeating this process 16 times and by combining sixteen 8-bit randomized keys k$_{ENC,1}$ (i=1 to 16), a 128-bit randomized key$_{ENC}$ is obtained.

An estimation of the scale of the circuit of the present example is as follows. The circuit of the present example is configured of two 128-bit key register, sixteen 8-bit 3-input 1-output (3-1) selector circuits and one 8-bit 16-input 1-output XOR circuit, and one 8-bit 16-1 demultiplexer circuit. Accordingly, when referring to the table of FIG. 21, its scale is 4.5 k bits.

Functional Effect

FIG. 37 illustrates a table which compares a scale of a circuit which executes a Rijndael algorithm of Comparative Example 1 and the scale of a circuit of the above Examples 1 to 7. By using the circuit of Examples 1 to 7, safe authentication may be realized against a side channel attack by a small-scaled circuit configuration without enlarging the circuit as was done in a conventional method 1.

Although in the above embodiment, an XOR circuit or a selector circuit is used as a compression circuit, an addition circuit or a subtraction circuit may be used. The circuit scale for the addition circuit or the subtraction circuit is about 10 gates/bit.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encryption processing device comprising:
a memory configured to store a common key; and
a processor configured
to generate a random number which is an integer, to generate a first randomized key by performing a bit transposition on the common key, the bit transposition being determined by the random number,
to transmit the random number to another encryption processing device and to receive a response from the other encryption processing device,
wherein the response is generated by the other encryption processing device by encryption of the random number using a second randomized key that is generated from the common key stored in the other encryption processing device and wherein the second randomized key is generated by performing the bit transposition determined by the random number;
to authenticate the other encryption processing device either by comparing the random number generated in the encryption processing device with the random number obtained by decrypting the response with the first randomized key, or by comparing the response with data obtained by encrypting the random number with the first randomized key.

2. The encryption processing device according to claim 1, wherein the processor includes at least one of a selector circuit, a linear feedback shift register circuit, and a connecting circuit.

3. The encryption processing device according to claim 1, wherein the processor performs a bit transposition on partial keys obtained by dividing the common key, the bit transposition being determined at least by the random number, generates randomized partial keys, and compresses the randomized partial keys into one, to generate the first randomized key.

4. The encryption processing device according to claim 1, wherein a processor of the other encryption processing device performs a bit transposition on a partial key obtained by dividing the common key, the bit transposition being determined by the random number as an input value of the bit transposition, generates randomized partial keys, and compresses the randomized partial keys into one, to generate the first randomized key.

5. The encryption processing device according to claim 4, wherein compression is performed by using at least one of an XOR circuit, a selector circuit, and an addition circuit or a subtraction circuit.

6. A method for authenticating a second device using a first device comprising a first encryption processing device having a common key, the second device comprising a second encryption processing device having a same key as the common key of the first device, the method comprising:
generating a random number by the first encryption processing device;
generating a first randomized key by performing a bit transposition on the common key, the bit transposition being determined by the random number by the first encryption processing device;
transmitting the random number to the second encryption processing device by the first encryption processing device;
receiving, by the first encryption processing device, a response from the second encryption processing device, the response generated by encryption of the random number using a second randomized key, wherein the second randomized key is generated by the second encryption processing device by performing a bit transposition determined by the random number transmitted by the first encryption processing device on the common key stored in the second encryption processing device; and
comparing the random number generated in the first encryption processing device with the random number obtained by decrypting the response with the first randomized key, or comparing the response with the data obtained by encrypting the random number with the first randomized key by the first encryption processing device.

7. The method for authenticating according to claim 6, wherein a bit transposition is performed on partial keys obtained by dividing the common key, the bit transposition being determined by the random number, and randomized partial keys are generated and are compressed into one, to generate the first randomized key, in the first device for processing encryption.

8. The method for authenticating according to claim 7, wherein a bit transposition is performed on partial keys obtained by dividing an input value of the integer, the bit transposition being determined by the random number, as an input value of the bit transposition, and randomized partial keys are generated and are compressed into one, to generate the first randomized key, in the second encryption processing device.

9. A key generating device comprising:
- a memory configured to store a common key;
- a random number generator configured to generate random numbers which are integers; and
- a bit transposer configured to perform a bit transposition on the common key, the bit transposition being determined by the random numbers, to generate a first randomized key which is used for encryption instead of the common key stored in the memory, and
- wherein the bit transposition is performed on the common key by dividing the common key into a plurality of partial keys, performing the bit transposition on the plurality of partial keys as determined by the random numbers to generate randomized partial keys, wherein each of which of the random numbers corresponds to one of the partial keys, and compressing the randomized partial keys into one key to generate the first randomized key.

10. The key generating device according to claim 9, wherein the bit transposer includes at least one of a selector circuit, a linear feedback shift register circuit, and a connecting circuit.

11. The key generating device according to claim 9, wherein compression of the randomized partial key is performed by using at least one of an XOR circuit, a selector circuit, and an addition or a subtraction circuit.

\* \* \* \* \*